(12) United States Patent
Sivasundaram et al.

(10) Patent No.: US 8,306,886 B2
(45) Date of Patent: Nov. 6, 2012

(54) SYSTEM AND METHOD FOR PREDICTING FUTURE PRICES OF A CUT MEAT

(75) Inventors: Lavan Sivasundaram, Toronto (CA); Jason Phillips, Toronto (CA); John Ferraro, Mississauga (CA)

(73) Assignee: Future Beef Partners Inc., Mississauga, Ontario (CA)

( * ) Notice: Subject to any disclaimer, the term of this patent is extended or adjusted under 35 U.S.C. 154(b) by 706 days.

(21) Appl. No.: 12/320,118

(22) Filed: Jan. 16, 2009

(65) Prior Publication Data

US 2010/0185555 A1 Jul. 22, 2010

(51) Int. Cl.
*G06Q 40/00* (2012.01)
(52) U.S. Cl. .......................................................... 705/35
(58) Field of Classification Search ............... 705/35–45
See application file for complete search history.

(56) References Cited

U.S. PATENT DOCUMENTS 6,745,150 B1 * 6/2004 Breiman ..................... 702/181
* cited by examiner

*Primary Examiner* — Richard C Weisberger
(74) *Attorney, Agent, or Firm* — Grant Tisdall; Gowling LaFleur Henderson LLP

(57) ABSTRACT

A system and method for determining a future price of a selected meat cut type (MCT) of an animal for a selected future time period (FTP) including: receiving the selected MCT; storing said selected MCT in a memory; using a price model configured for determining said future price of said selected MCT for the selected FTP, said future price based on one or more defined risk levels, historical market price of said selected MCT for one or more time periods prior to said selected FTP, and live animal futures defining a price of the live animal traded as a commodity; determining via the model the future price of the selected MCT for the selected FTP, a price premium for the selected MCT for the selected FTP, and a hedge relationship defining the relative price of the live animal futures with said future price for the selected FTP; and sending the future price and the price premium for the selected MCT for the selected FTP for presentation on a user interface.

27 Claims, 23 Drawing Sheets

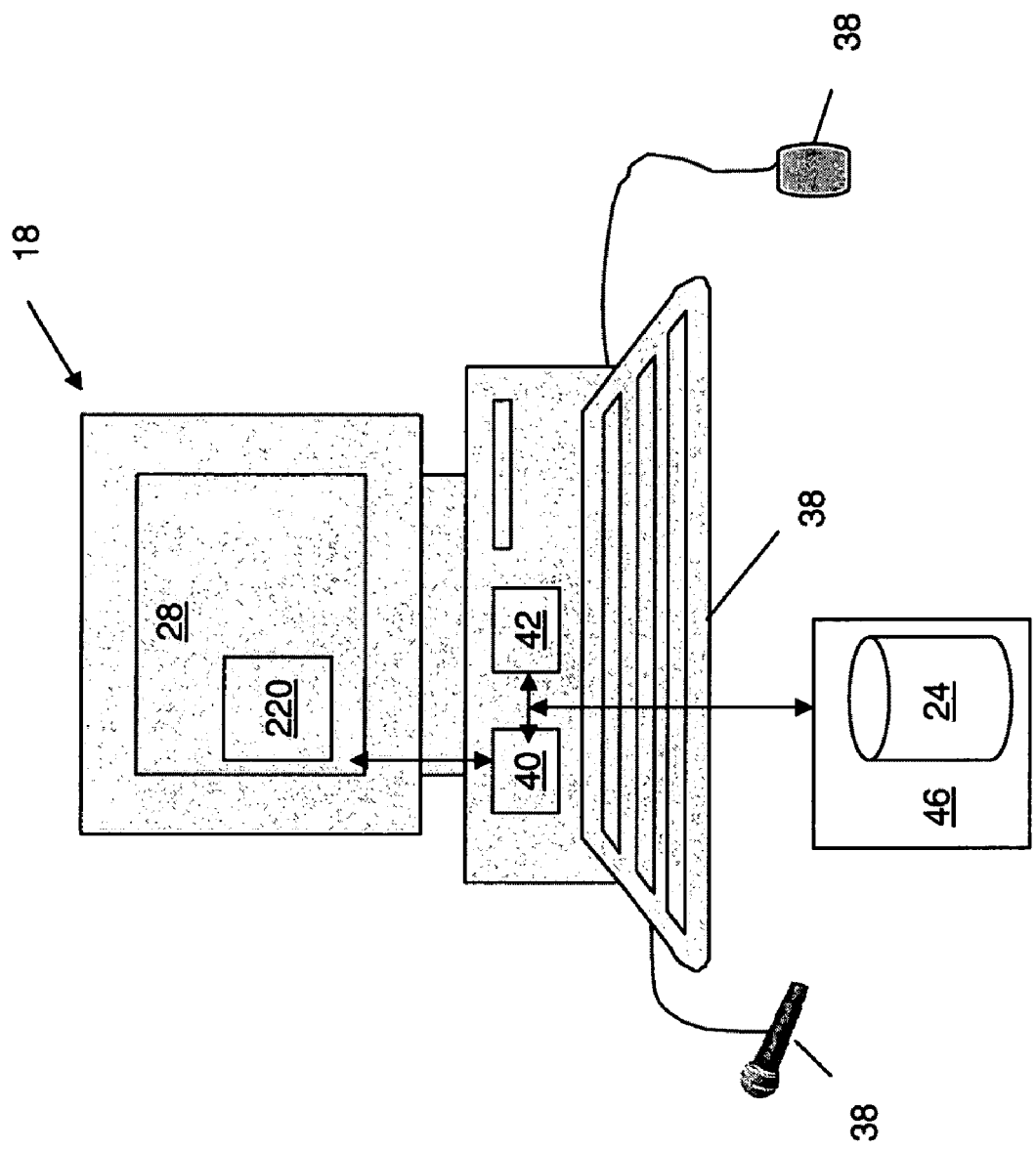

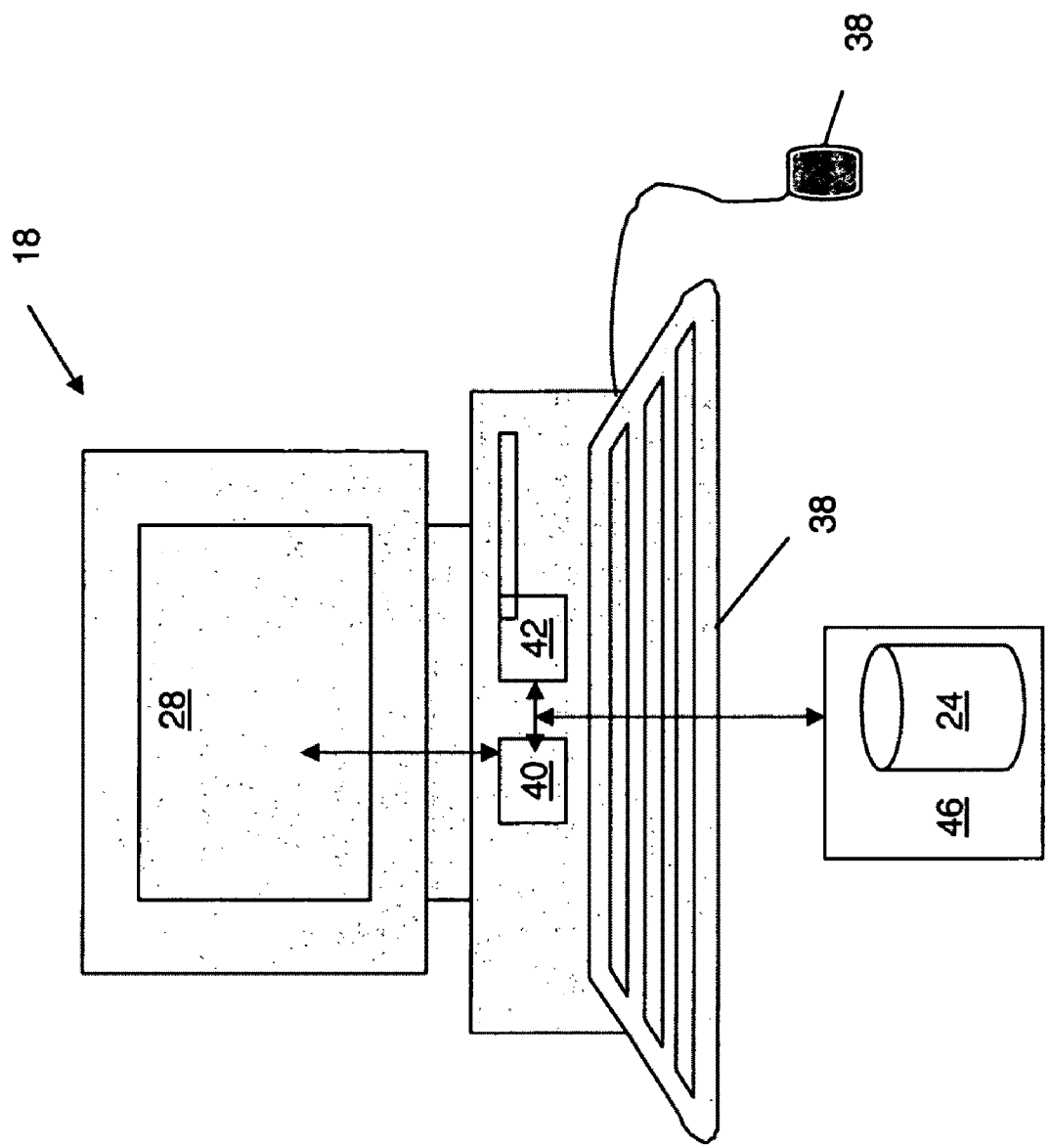

| Delivery Month | $ Live Cattle | Benchmark | Daily Change | BRP | Basis Risk | Go Mkt Risk | Down Mkt Risk |
|---|---|---|---|---|---|---|---|
| April 2009 | $0.90250 | 3.5826 | -0.0643 ↓ | 0.1169 | 0.3165 | 3.8991 | 3.2662 |
| May 2009 | $0.90250 | 3.4175 | -0.0490 ↓ | 0.0937 | 0.2537 | 3.6712 | 3.1638 |
| June 2009 | $0.89650 | 3.3327 | -0.0403 ↓ | 0.1132 | 0.3065 | 3.6392 | 3.0263 |
| July 2009 | $0.89650 | 3.3210 | -0.0421 ↓ | 0.0681 | 0.1845 | 3.5055 | 3.1365 |
| August 2009 | $0.93000 | 3.3314 | -0.0336 ↓ | 0.0845 | 0.2291 | 3.5601 | 3.1026 |
| September 2009 | $0.93000 | 3.2240 | -0.0374 ↓ | 0.0985 | 0.2667 | 3.4907 | 2.9573 |
| October 2009 | $0.93100 | 3.2613 | -0.0317 ↓ | 0.1356 | 0.3759 | 3.6372 | 2.8254 |
| November 2009 | $0.92775 | 3.4213 | -0.0478 ↓ | 0.1623 | 0.4501 | 3.8715 | 2.9712 |
| December 2009 | $0.92750 | 3.5042 | -0.0521 ↓ | 0.0802 | 0.2223 | 3.7265 | 3.2819 |
| January 2010 | $0.92750 | 3.1572 | -0.0614 ↓ | 0.1489 | 0.4030 | 3.5602 | 2.7542 |

Figure 11b

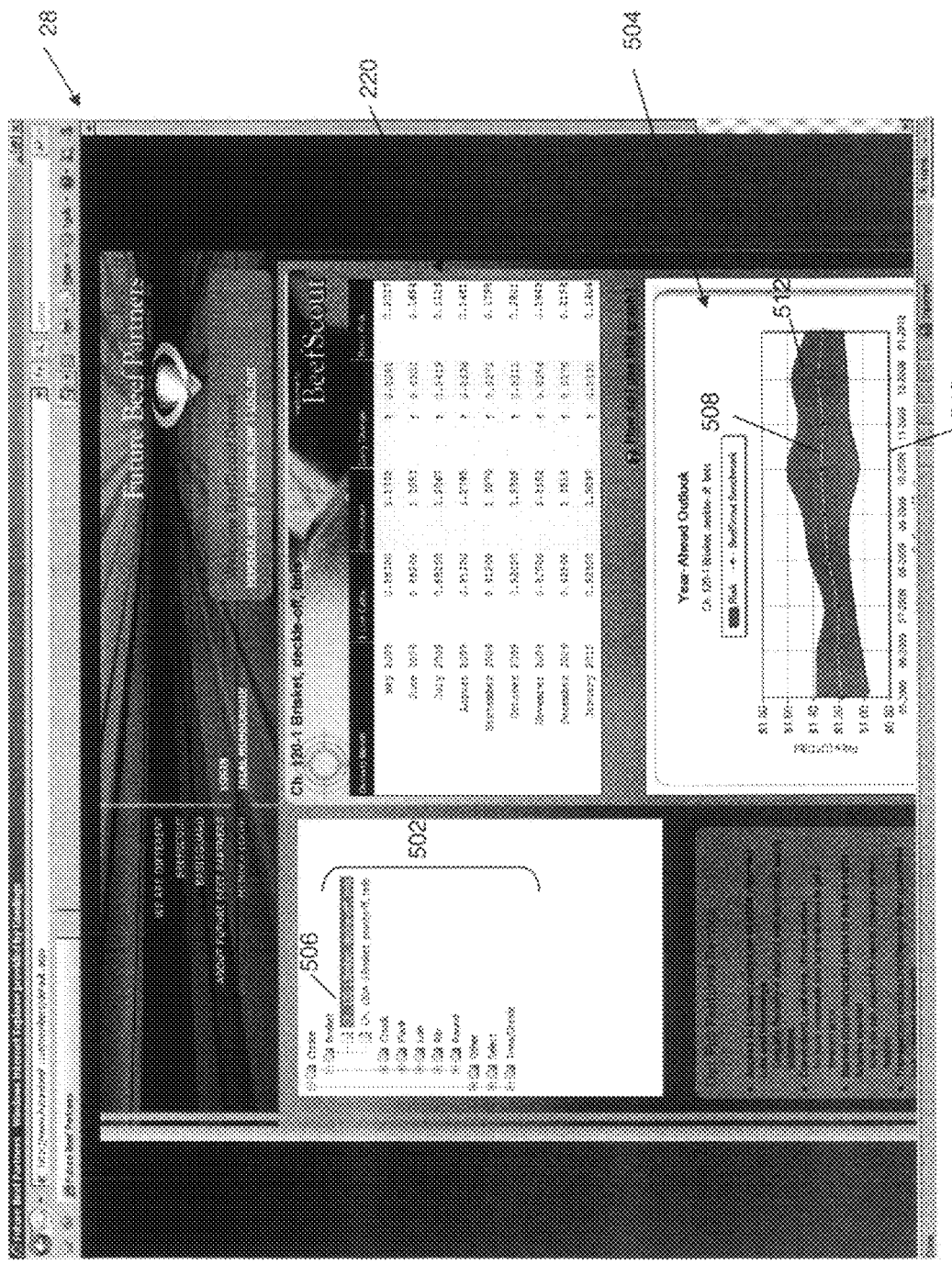

| Cut | Portfolio Weighting | Individual BRP | Portfolio BRP |
|---|---|---|---|
| 90s | 32% | $0.0748 | |
| 50s | 18% | $0.0833 | |
| Ch. 112A Ribeye, bnls | 15% | $0.3520 | |
| Ch. XT Strip Loin 0x1 | 15% | $0.3449 | |
| Se. XT Clod | 10% | $0.0648 | |
| Se. XT Inside Round | 10% | $0.0696 | |
| Weighted Average | 100% | $0.1569 | $0.0995 |
| Portfolio Effect | | | + $0.0574 |

Figure 20

SYSTEM AND METHOD FOR PREDICTING FUTURE PRICES OF A CUT MEAT

BACKGROUND OF THE INVENTION

The present invention relates to predicting the future prices of commodities, and more particularly to predicting the future prices of cuts of meat.

Grocers, restaurants and other entities that are purchasers of meat generally buy individual cuts of meat from packers and processors who handle the slaughtering, processing and distribution of the finished product. A foremost concern of meat purchasers is the stability in the price that they pay for a specific cut of meat. It is the practice of some meat purchasers, such as restaurants, to establish a set price for each meal offered on a menu for a period of time. It is undesirable to change the menu price frequently because consumers expect price stability and expect to pay the same amount of money for the same meal. Other meat purchasers such as grocers and some packers and processors also face variable input costs in the price of cuts of meat and prefer to avoid passing volatile input costs onto their customers whenever possible. Meat purchasers have several options in managing their purchases of cuts of meat. A meat purchaser may choose to buy a quantity of a certain cut of meat on a day-to-day basis when their inventory of the cut of meat desired falls below a certain level. This process introduces a significant amount of risk into the purchaser's business because of the day-to-day fluctuation in the price of a cut of meat. This type of risk is referred to as market risk.

Additionally, a purchaser may attempt to predict the future price of a specific cut of meat based on the historical relationship between the specific cut and the price of futures contracts for live cattle. As an example, it is known in the art that, although many factors go into the price of a specific beef product, none is more dominant than the price of cattle. The traditional industry practice in forecasting prices of a cut of meat has been to develop a ratio between the historic cash price of a cut of meat and the relevant live cattle futures value. Once this ratio has been determined, price forecasts are calculated by applying the ratio to the current market price of live cattle futures contracts. This method of modeling has known disadvantages, including for example, an introduction of bias as the model is forced through an unobserved 0 value. Therefore, the forecasts driven by this ratio model will carry biases forward through time as the model predicts future prices of a cut of meat. There is also risk that the predicted prices from the ratio model will not accurately reflect the market price of the selected cut over time. Additionally, meat purchasers generally do not have the expertise necessary to accurately forecast future prices of cuts of meat, as this is not part of their core business.

SUMMARY OF THE INVENTION

Accordingly, it is an object to provide a system and method for determining futures prices of a meat cut to obviate or mitigate at least one of the above-mentioned disadvantages.

According to a first aspect, there is provided a method for determining a future price of a selected meat cut type (MCT) of an animal for a selected future time period (FTP), the method including the steps implemented on a computer processor of: receiving the selected MCT; storing said selected MCT in a memory; using a price model configured for determining said future price of said selected MCT for the selected FTP, said future price based on one or more defined risk levels, historical market price of said selected MCT for one or more time periods prior to said selected FTP, and live animal futures defining a price of the live animal traded as a commodity; determining via the model the future price of the selected MCT for the selected FTP, a price premium for the selected MCT for the selected FTP, and a hedge relationship defining the relative price of the live animal futures with said future price for the selected FTP; and sending the future price and the price premium for the selected MCT for the selected FTP for presentation on a user interface.

According to another aspect, there is provided a system for determining a future price of a selected meat cut type (MCT) of an animal for a selected future time period (FTP), the system including: a computer processor; a receipt module for receiving said selected MCT; a memory for storing said selected MCT; a predictor module configured for using a price model to determine said future price of said selected MCT for the selected FTP, said future price based on one or more defined risk levels, historical market price of said selected MCT for one or more time periods prior to said selected FTP, and live animal futures defining a price of the live animal traded as a commodity; the predictor module further configured for determining via the price model the future price of the selected MCT for the selected FTP, a price premium for the selected MCT for the selected FTP, and a hedge relationship defining the relative price of the live animal futures with said future price for the selected FTP; and a presentation module for sending the future price and the price premium for the selected MCT for the selected FTP for presentation on a user interface.

DESCRIPTION OF FIGURES

FIG. 2 is a diagram of an exemplary electronic device used for interacting with the portfolio management tool of FIG. 1;

FIG. 11b is an alternative exemplary prediction table displayed to a user of the portfolio management tool of FIG. 1;

FIG. 12a is an exemplary visual representation displayed to a user of the portfolio management tool of FIG. 1;

FIG. 20 is a table illustrating the net financial benefit provided by the tool of FIG. 15;

DESCRIPTION OF EMBODIMENTS

Data Processing System 10

Figure 1:
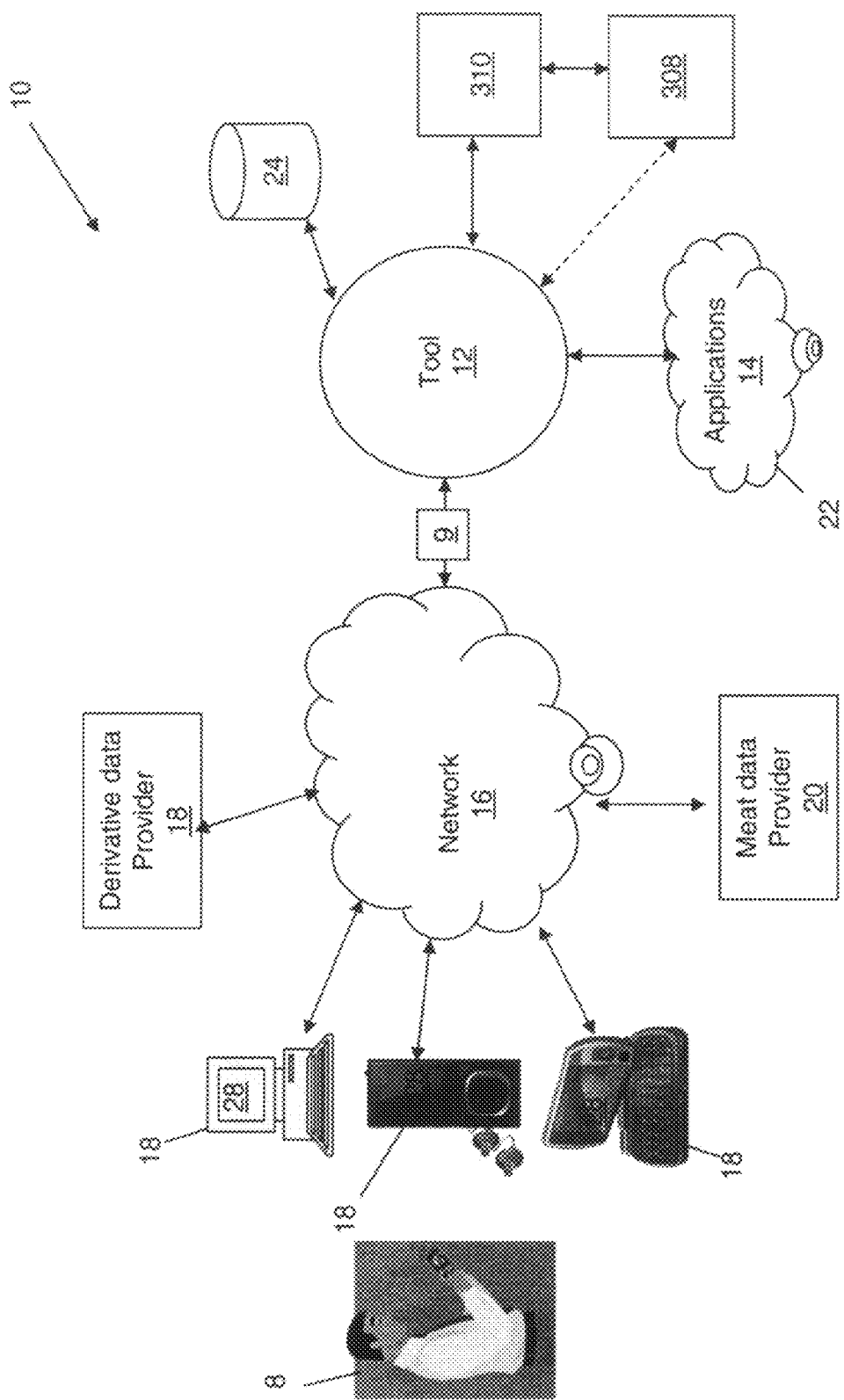
FIG. 1 is a schematic of a data processing system that includes a portfolio management tool.

Referring to FIG. 1, a data processing system 10 is presented for electronically predicting, quoting, managing and securing forward prices of cuts of meat, for example in a portfolio. Real-time derivative data, such as the current prices of live animal (e.g. cattle, hogs, etc.) futures contracts are provided to the electronic portfolio management tool 12 by a derivative data provider 18, such as the Chicago Mercantile Exchange (CME), via the network 16. A futures contract is a standardized contract, traded on a securities exchange 310, to buy or sell a quantity of a specified commodity (such as live cattle) at a specified date in the future, at a specified price. The future price is determined by the instantaneous equilibrium between the forces of supply and demand among competing buy and sell orders on the exchange 310 at the time of the purchase or sale of the contract. The future date is called the delivery date or final settlement date. The official price of the futures contract at the end of a day's trading session on the exchange 310 is called the settlement price for that day of business on the exchange 310. Periodically, the portfolio management tool 12 receives (either automatically or by request) prices (e.g. averaged) of a specific cut of meat from a meat data provider 20, such as the daily prices reported for the specific cut of meat by the United States Department of Agriculture (USDA). The portfolio management tool 12 communicates with applications 14 to generate a dynamic and interactive visual representation 28 that is presented to the member 8. As will be appreciated, applications 14 may be distributed across a public or private network 22 or may reside on the same electronic device 18 (not shown) of the electronic portfolio management tool 12. It will also be appreciated that the meat data provider 20 and the derivative data provider 18 may be accessible by the tool 12 via the network 16 as shown, or via a direct communications link. The tool 12 is operable to access a trading system 308 for buying and selling futures contracts on a futures market 310, such as the CME. The trading system 308 may be an electronic component of a futures market 310 or may be an electronic service offered by a third party for executing instructions related to the buying and selling of securities.

In one embodiment of the invention, the customer or the member 8 can use various electronic or digital devices 18, such as but not limited to cell phones, mobile computers, home computers, pagers and PDAs, to interact with the portfolio management tool 12. For example, the member 8 may choose to view predicted prices (i.e. in a future time period as compared to the present time period in which the prices are viewed) and secure predicted prices of a particular cut of meat. The member 8 communicates with the portfolio management tool 12 by sending requests 9 via the network 16 that are generated when the member 8 interacts with a visual interface 28 (such as but not limited to a web page) that is presented to the member 8 on the digital device 18. As will be appreciated, in one embodiment, the portfolio management tool 12 may be in communication with applications 14 to process requests 9 submitted by the member 8 and to dynamically generate and update the visual representation 28 that is presented to the user 8. As shown, the portfolio management tool 12 is operable to access data in the tables 24 and to store data in the tables 24. The tables 24 are in electronic communication with the tool 12. It will be appreciated that the networks 16, 22 may include public or private networks, a group of wireless and/or wired networks or any other medium that facilitates communication between electronic devices 18.

Electronic Device 18

Referring to FIG. 2, the generic electronic device 18 can include input devices 38, such as a keyboard, microphone, mouse and/or touch screen by which the member 8 interacts with the visual interface 28. It will also be appreciated that the tool 12 resides on an electronic device 18 which may include similar components to the electronic device 18 employed by the user 8. A processor 42 can co-ordinate through applicable software the entry of data and requests 9 into the memory 40 and then display the results on a screen as visual representation 28. A storage medium 46 can also be connected to device 18, wherein software instructions and/or member data is stored for use by the tool 12. As shown, the storage medium 46 includes tables 24 wherein member data is stored as well as data received from the derivative data provider 18 and the meat data provider 20.

The software instructions can comprise code and/or machine readable instructions for implementing predetermined functions/operations including those of an operating system, the tool 12, or other information processing system, for example, in response to commands or inputs provided by a user 8 of the tool 12. The processor 42 (also referred to as module(s) for specific components of the tool 12) as used herein is a configured device and/or set of machine-readable instructions for performing operations as described by example above.

As used herein, the processor/modules in general may comprise any one or combination of, hardware, firmware, and/or software. The processor/modules act upon information by manipulating, analyzing, modifying, converting or transmitting information for use by an executable procedure or an information device, and/or by routing the information with respect to an output device. The processor/modules may use or comprise the capabilities of a controller or microprocessor, for example. Accordingly, any of the functionality provided by the systems and processes of FIGS. 1-20 may be implemented in hardware, software or a combination of both. Accordingly, the use of a processor/modules as a device and/or as a set of machine readable instructions is hereafter referred to generically as a processor/module for sake of simplicity.

It will be understood by a person skilled in the art that the memory 40 storage described herein is the place where data is held in an electromagnetic or optical form for access by a computer processor. In one embodiment, storage 40 means the devices and data connected to the computer through input/output operations such as hard disk and tape systems and other forms of storage not including computer memory and other in-computer storage. In a second embodiment, in a more formal usage, storage 40 is divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be much faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

Referring to FIG. 2b, the portfolio management tool 12 resides on and is implemented by one or more generic electronic devices 18. Generic device 18 may be a server that makes available the tool 12 to the member 8 over the network 16. As known, device 18 may include input devices 38, such as a keyboard, microphone, mouse and/or touch screen by which the provider of the tool 12 interacts with the tool 12 via the visual interface 28. A processor 42 can co-ordinate through applicable software the entry of data and requests 9 into the memory 40 and then display/present the results on a screen as visual representation 28. It will be understood that the visual representation 28 displayed to the provider of the tool 12 may be different than the visual representation displayed to a member 8. Further, it is recognised that the visual representation 28 can be presented (as a result of operation of the tool 12) to the member 8 on their client (e.g. of the tool 12 implemented on a networked server) electronic device 18 via the network 16. A storage medium 46 can also be connected to device 18, wherein software instructions, applications 14, member data, and other data is stored for use by the tool 12. As shown, the storage medium 46 includes tables 24 wherein member data is stored as well as data received from the derivative data provider 18, the meat data provider 20, and the exchange 310 amongst other information.

The software instructions may comprise code and/or machine readable instructions for implementing predetermined functions/operations including those of an operating system, the tool 12, or other information processing system, for example, in response to commands or inputs provided by a user 8 and/or the provider of the tool 12. The processor 42 (also referred to as module(s) for specific components of the tool 12) as used herein is a configured device and/or set of machine-readable instructions for performing operations as described by example above. Some or all of the modules of the tool 12 may be distributed across a network as applications 14 or reside on the electronic device 18. As is understood, some or all of the modules of the tool 12 may also be downloadable to the electronic device 18 of the member 8 and will be in communication with other modules of the tool 12 on the electronic device 18 of the provider of the tool 12.

As used throughout, the processor/modules on the device 18 of the tool 12 in general may comprise any one or combination of, hardware, firmware, and/or software. The processor/modules act upon information by manipulating, analyzing, modifying, converting or transmitting information for use by an executable procedure or an information device, and/or by routing the information with respect to an output device. The processor/modules may use or comprise the capabilities of a controller or microprocessor, for example. Accordingly, any of the functionality provided by the systems and processes of FIGS. 1-20 may be implemented in hardware, software or a combination of both. Accordingly, the use of a processor/modules as a device and/or as a set of machine readable instructions is referred to generically as a processor/module for sake of simplicity.

It will be understood by a person skilled in the art that the memory 40 of the electronic device 18 of the tool 12 described herein is the place where data is held in an electromagnetic or optical form for access by a computer processor. In one embodiment, storage 40 means the devices and data connected to the computer 18 through input/output operations such as hard disk and tape systems and other forms of storage not including computer memory and other in-computer storage. In a second embodiment, in a more formal usage, storage 40 is divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be much faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

Database 24

A database or tables 24 is a further embodiment of memory 40 as a collection of information that is organized so that it can easily be accessed, managed, and updated. In one view, databases can be classified according to types of content: bibliographic, full-text, numeric, and images. In computing, databases are sometimes classified according to their organizational approach. As well, a relational database is a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Computer databases 24 typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory 40 storage is the electronic holding place for instructions and data that the computer's microprocessor 42 can reach quickly. When the computer 18 is in normal operation, its memory 40 usually contains the main parts of the operating system and some or all of the application programs and related data that are being used. Memory 40 is often used as a shorter synonym for random access memory (RAM). This kind of memory is located on one or more microchips that are physically close to the microprocessor in the computer.

Portfolio Management Tool 12

Figure 3:
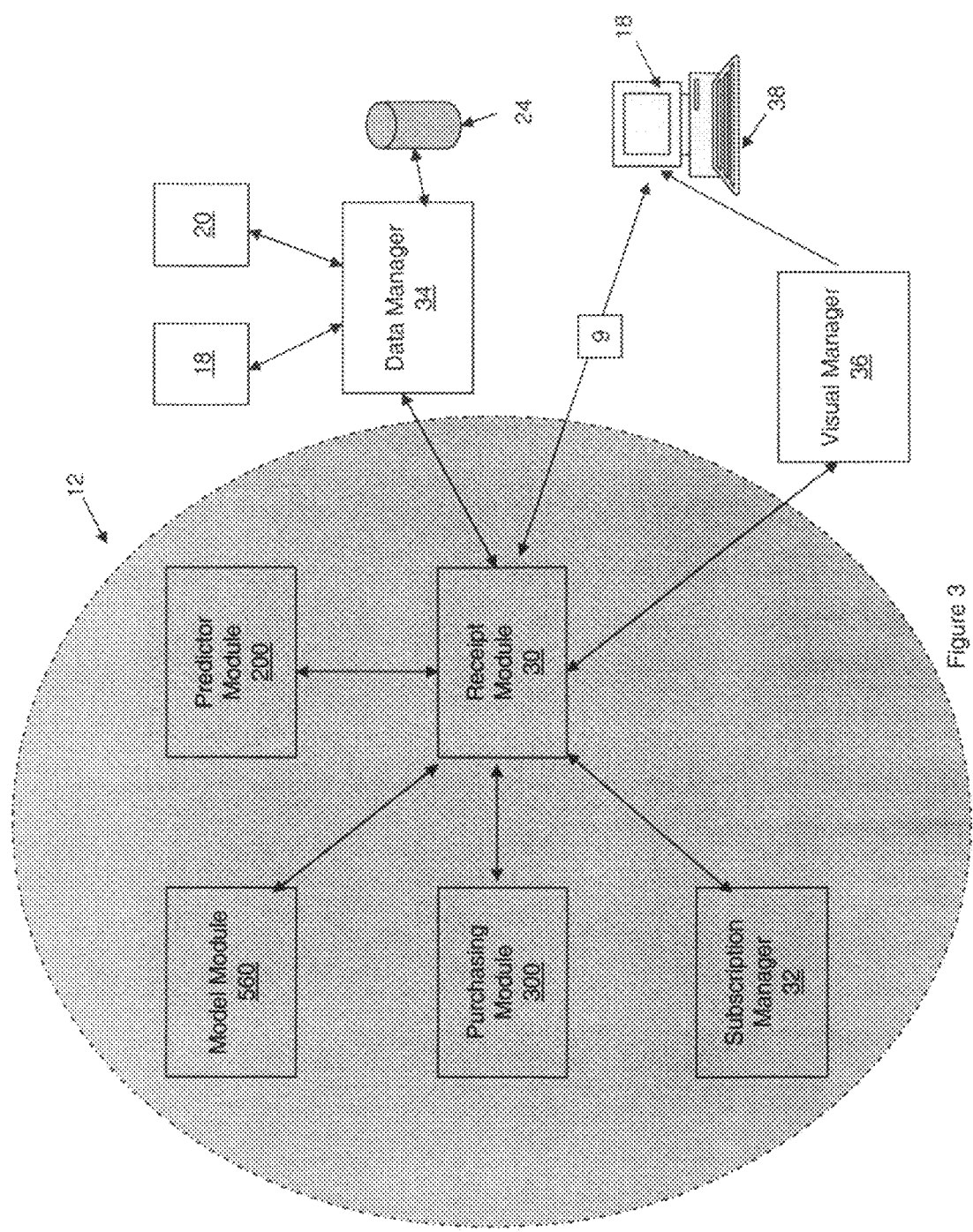
FIG. 3 is a component diagram of an embodiment of the portfolio management tool of FIG. 1.

Reference is next made to FIG. 3, which shows a component diagram of a portfolio management tool 12. As shown, the tool 12 includes a receipt module 30 for managing user requests 9 and for directing user requests 9 to one or more of the appropriate modules 32, 200, 300 and/or 560. As the member 8 interacts with visual representation 28 via their input devices 38, the receipt module 30 co-ordinates the responsibilities and tasks of the other modules 32, 200, 300 and/or 560 of the management tool 12. The management tool 12 communicates with a data manager 34 which is operable to retrieve data from and send data to the tables 24 upon instruction from the receipt module 30 and/or the other components of the tool 12. The data manager 34 is also in electronic communication with the derivative data provider 18 and the meat data provider 20. The visual manager/module 36 is instructed by the components of the management tool 12 to recreate and redraw the visual representation 28 for viewing and further interaction by the user or member 8. It is recognised that the visual manager/module 36 can present the representation 28 on the display of the tool 12 and/or send the representation 28 over the network 16 for presentation on the display of the member's networked device 18

The tool 12 includes a Model Module 560 for creating particular model(s) 204 of the portfolio management tool 12. As described below, the model module 560 is operable to create a model 204 for each meat cut (e.g. and for associated delivery time period—e.g. month) that is offered to the member 8 by the tool 12. The model module 560 instructs the data manager 34 to store each model 204 in the tables 24 or directly into memory 40 of the electronic device 18 for use by the other components of the tool 12. The tool 12 also includes a Predictor Module 200 which is operable to generate the future predicted prices of a cut of meat for a selected future time period upon selection by the user 8. The predictor module 200 is in communication with and retrieves the appropriate model 204 from the model module 560 (or directly from tables 24 or memory 40). The predictor module 200 uses the model 204 to create a prediction table 220 and instructs the visual manager 36 to render the prediction table 220 to the visual interface 28 for viewing and interaction by the member 8 (either locally and/or remotely to the tool 12). The tool 12 also includes a Purchasing Module 300 for buying and selling live animal futures contracts on a futures market 310. The purchasing module 300 retrieves a hedge ratio 906 from the model module 560 and determines the number of live animal futures to buy. Once the number of live futures is determined by the purchasing module 300, components of the purchasing module buy the number of live futures and store the information regarding the trade in the tables 24 via the data manager 34. The tool 12 also includes a subscription manager/module 32 for managing the member accounts of the members 8 and for instructing the visual manager 36 the information to display to the member 8 and the types of interaction that the member 8 is allowed to perform with the tool 12.

Subscription Manager/Module 32

Figure 4:
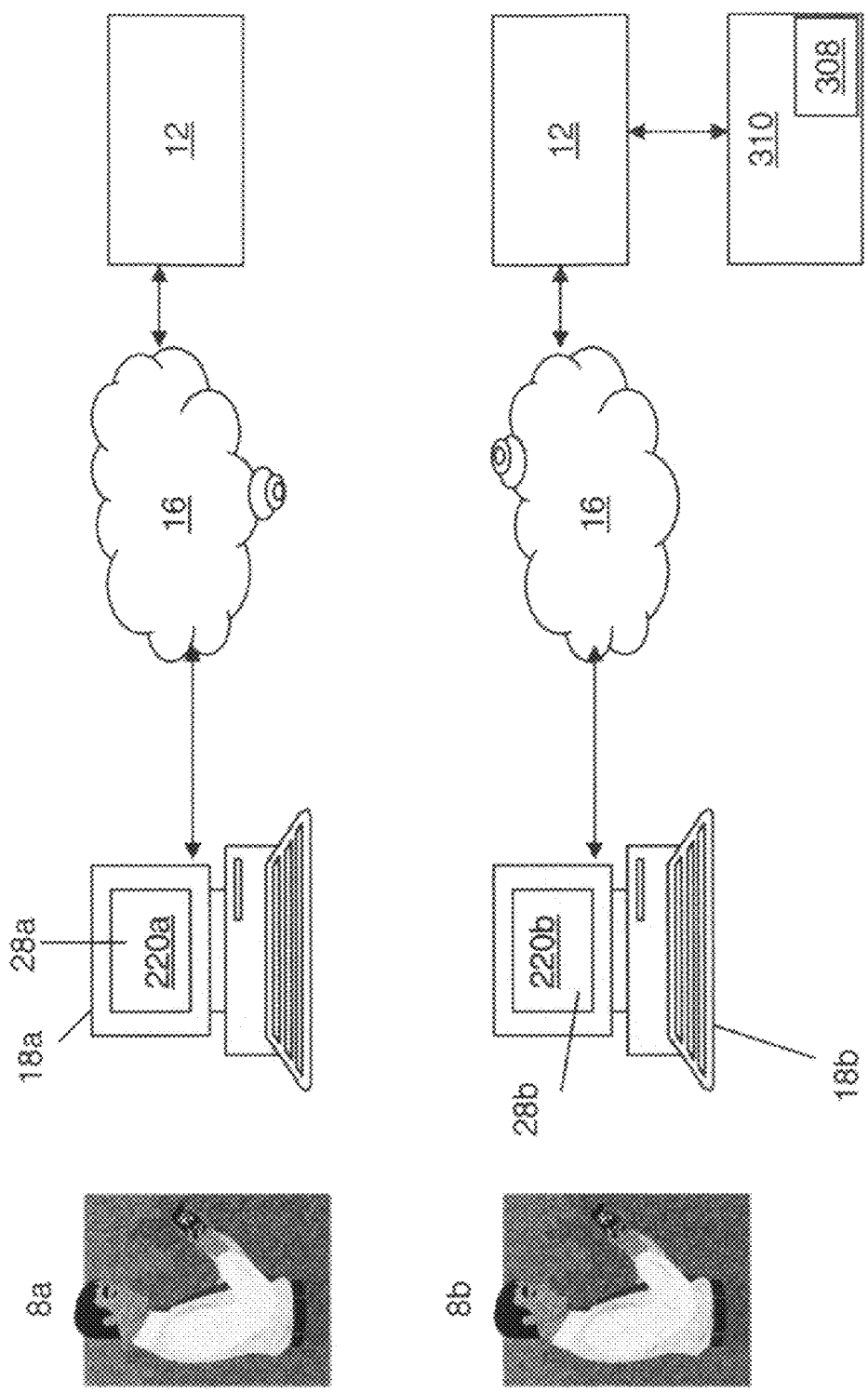
FIG. 4 shows the membership levels of different users of the portfolio management tool of FIG. 3.

Referring next to FIG. 4, it is shown that the tool 12 enables members 8a, 8b to have different membership levels that are obtained from the provider of the portfolio management tool 12 through a subscription or membership. By different membership levels, it is meant that members 8a, 8b are able to view different information and interact differently with the portfolio management tool 12. As shown, member 8a interacts with the visual interface 28a on electronic device 18a. The member 8a is allowed to view a prediction table 220a for a selected cut of meat for the selected delivery period; however, the user 8a is unable to secure the forward price for the selected cut for a selected delivery period, because the member 8a does not have the required permission to secure forward prices. In addition, the member 8a is able to see the risk level associated with a predicted price of the selected cut of meat, but the member 8a is not able to see the premium that would be charged to the member 8a to eliminate this risk. Contrarily, the member 8b is able to view the predicted price of the selected cut, and is also able to secure the forward price for a desired quantity of the selected cut for a chosen delivery month. The member 8b is able to view the risk levels associated with the predicted future prices for the selected cut and is also able to see the premium that is charged to the member 8b in exchange for the provider of the tool 12 eliminating the risk (i.e. by the provider securing forward prices of the selected cut for the member 8b). As shown, the tool 12 is in communication with the futures market 310 and an associated trading system 308. When the member 8b requests to secure forward prices, the tool 12 buys a certain number of live cattle futures contracts by accessing the trading system 308 to protect the provider of the tool 12 against market price movements in the particular cut of meat selected. It will be appreciated that the tool 12 is capable of having any number of membership levels for each member 8a, 8b that has permission to access the tool 12. For example, the tool 12 may allow one member 8a to secure prices for a selected cut of meat, and allow another member 8b (or the same member 8a) to secure prices for another commodity that is associated with a futures contract (e.g. pork bellies) that is traded on a public market 310.

Logging on to the Portfolio Management Tool 12

Figure 5:
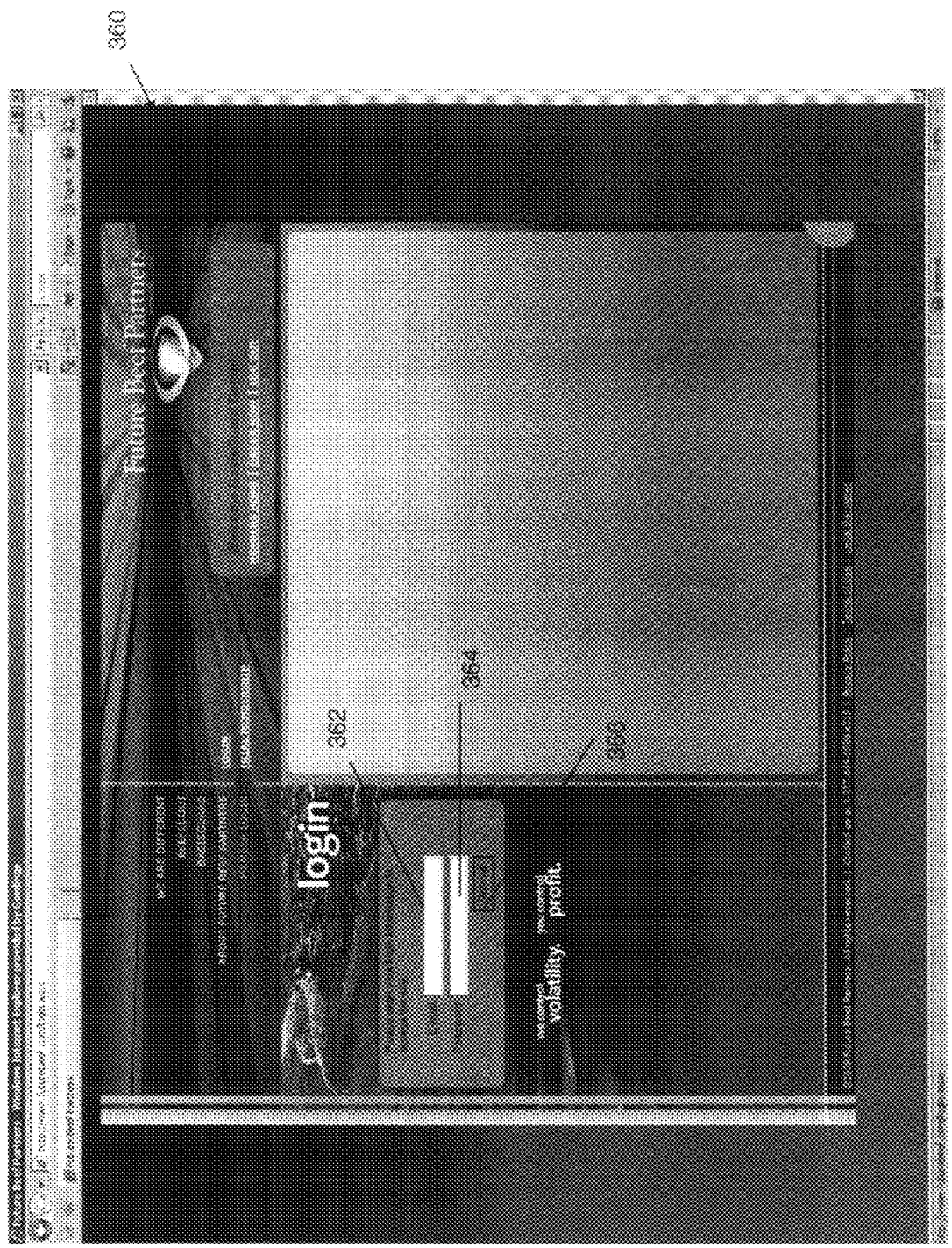
FIG. 5 is an exemplary log-in screen of the portfolio management tool of FIG. 3.

Reference is next made to FIG. 5 which illustrates an exemplary log-in screen 360 for interacting with the electronic portfolio management tool 12. The log-in screen 360 may be a web-page that is displayable on the device 18. The member 8 accesses the log-in screen 360 in known manner by employing a web-browser and instructing the web-browser to display the log-in screen 360 (for example, by typing the web-address of the log-in screen 360 into the browser or by performing a web search for the provider of the tool 12). As shown, the log-in screen 360 includes a user ID field 362 for receiving the user ID from the member 8, a password field 364 for receiving a password from the member 8, and a submit button 366 for submitting the user ID and password to the portfolio management tool 12 and for gaining access to the portfolio management tool 12 if the member 8 has permission. To gain access to the portfolio management tool 12, the member 8 must enter a preselected user ID into the user ID field 362 and a preselected password into the password field 364. As will be appreciated, the user ID and the password are unique to the member 8. Once the user ID and password are entered, the member 8 selects the submit button 366. The interactions of the user 8 are processed by the receipt module 30. The receipt module 30 captures the user ID and password entered and communicates the data to the subscription manager 32 which is operable to determine if the user ID and password are valid and to manage the information and features that are available to the member 8. The subscription manager 32 uses the entered user ID and password to construct a query and requests a data set from the data manager 34. The data manager 34 processes the query and returns a data set to the subscription manager 32 that corresponds to the criteria of the query. The subscription manager 32 analyzes the data set and instructs the visual manager 36 to generate a visual representation 28 for display as a web page. If the subscription manager 32 determines that the member 8 has permission to access the tool 12, the subscription manager 32 instructs the visual manager 36 to display a welcome screen as a web page to the member 8 and to display certain controls on the visual representation 28 that correspond to the permission level of the member 8. Contrarily, if the subscription manager 32 determines that the member 8 does not have permission to access the tool 12 (or determines that the password and/or the user ID are incorrect), the subscription manager 32 instructs the visual manager 36 to display a web-page to the user 8 which informs the user 8 that the password and/or user ID are not recognized by the tool 12.

Model Module 560

Figure 6:
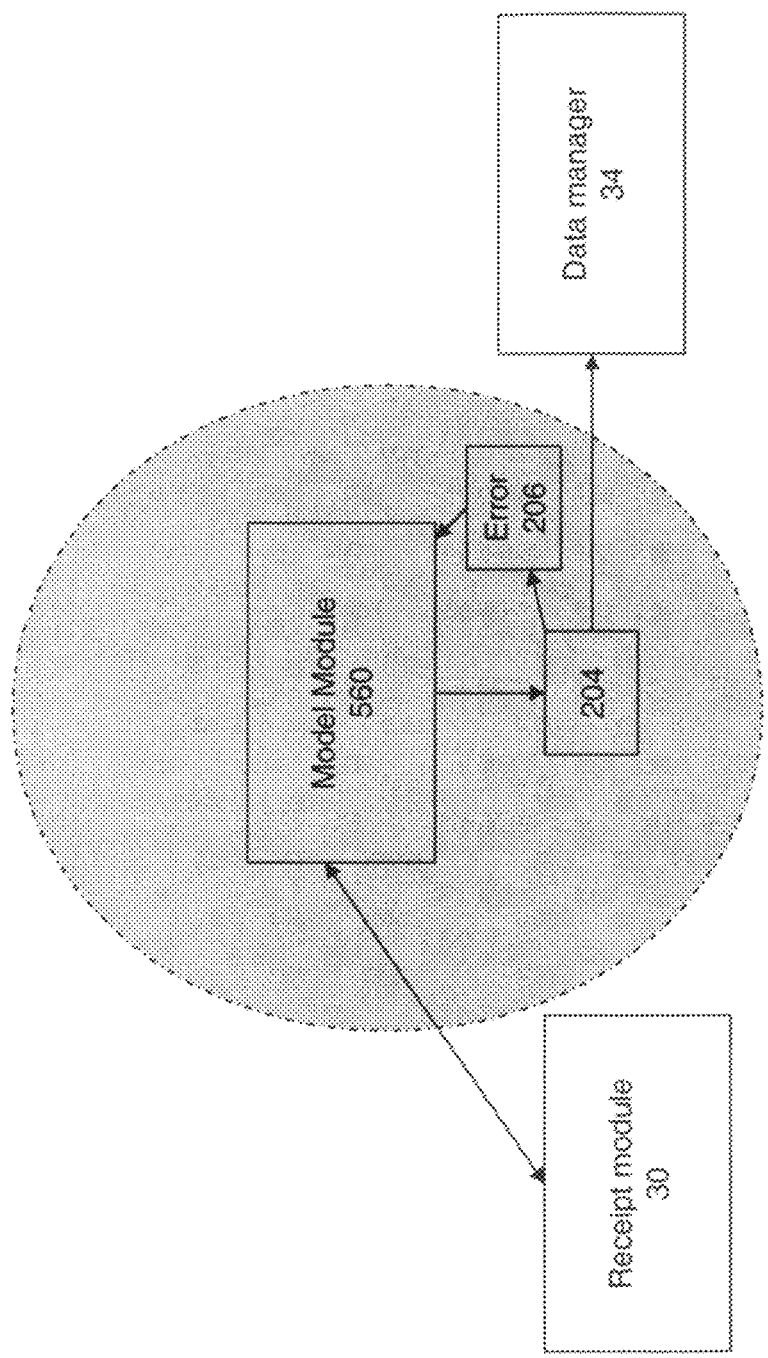
FIG. 6 shows a model module of the portfolio management tool FIG. 3.

Reference is next made to FIG. 6, which illustrates the model module 560 of the portfolio management tool 12. The model module 560 is operable to create one or more model(s) 204 for each cut of meat and associated delivery future time period for which the provider of the tool 12 will secure forward prices (e.g. predicted future prices) to a member 8. Each model 204 is operable to predict the forward/future price of a particular cut of meat based on the historical relationship between the market prices of the particular cut of meat and the prices of live animal futures contracts for the animal from which the cut of meat is derived. The model module 560 creates each model 204 by employing the steps outlined in FIG. 7, and instructs the data manager 34 to store each model 204 in the tables 24 or into memory 40. When a user 8 requests a prediction for a particular cut of meat, the receipt module 30 instructs the model module 560 to create a model 204 that represents the selected cut of meat. In one embodiment, the model module 560 retrieves the appropriate model 204 from the data manager 34. If the particular model 204 does not exist (i.e. it has not been created yet) the model module 560 creates a new model 204 by performing the operations illustrated in FIG. 7. If the particular model 204 exists, the model module 560 may update the model 204 using data from the data manager 34 that was not previously applied to the model 204. Alternatively, the model module 560 may determine that the model 204 is up-to-date and will instruct the receipt module 30 that the model 204 is ready for use by the other components of the tool 12.

Figure 7:
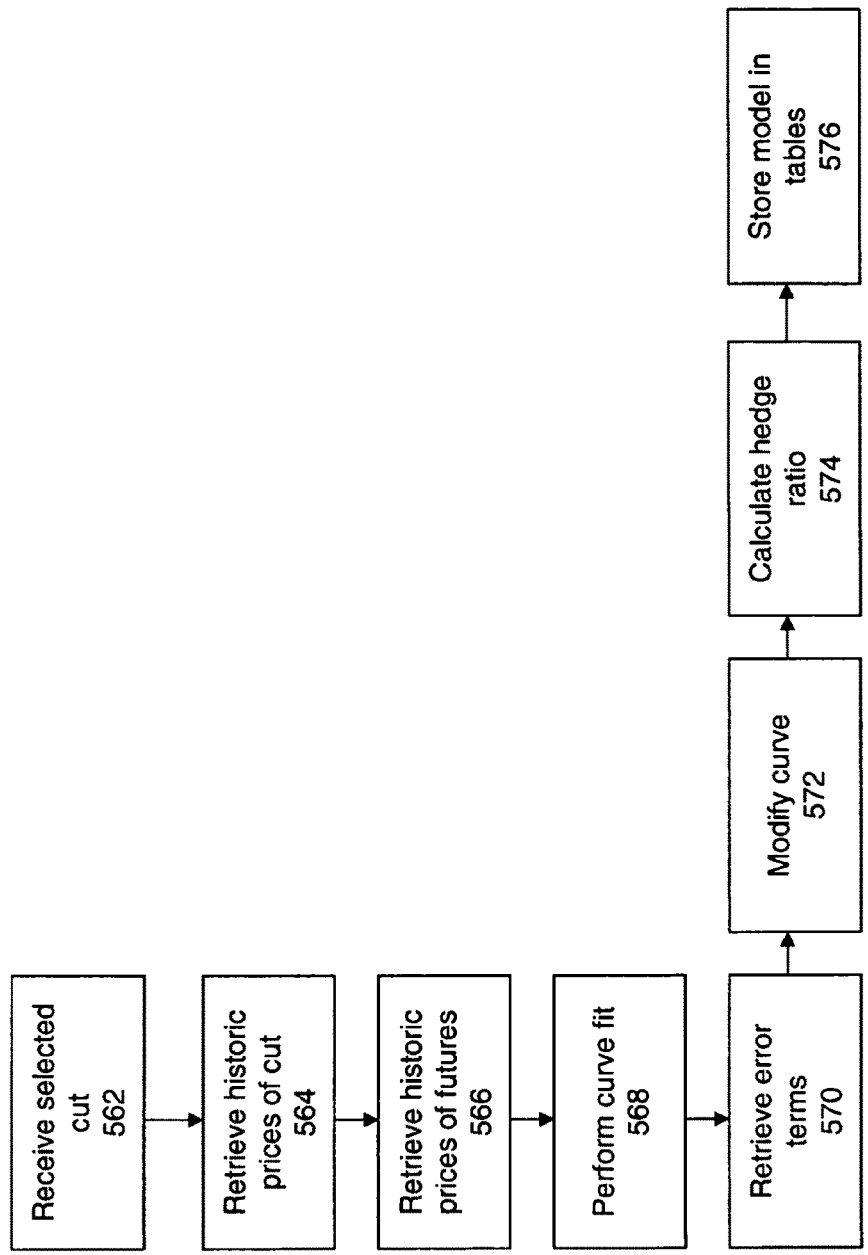
FIG. 7 is a flow-chart of steps performed by the model module of FIG. 6.

Reference is next made to FIG. 7, which illustrates the series of steps that the model module 560 performs to create each prediction model 204 of the tool 12. As mentioned above, each cut of meat can have a model 204 that is created for each delivery future time period. At step 562, the model module 560 is provided for representing the selected cut of meat and the selected delivery period from the receipt module 30. The model module 560 retrieves the historic prices of the selected cut from the meat data provider 20 via the data manager 34 at step 564. At step 566, the model module 560 retrieves the historic prices of live animal futures contracts from the derivative data provider 18. It will be appreciated that steps 564 and 566 may be performed in parallel or sequentially. Next, at step 568, the model module 560 performs a curve fitting function (such as a regression analysis) on the historic prices and creates a curve of best fit which is stored in memory or in the tables 24 for further use by the tool 12. At step 570, the model module 560 retrieves error terms 206 from other models 204 for the selected cut, but for different delivery periods. For example, the model module 560 may retrieve error terms 206 for models 204 that correspond to the same cut, but for one month and/or two months before the delivery period desired by the user 8. At step 572, the module 560 modifies the curve of best fit to give the curve greater predictive abilities by applying the error terms 206 as properties of the curve. At step 574, the model module 560 calculates the hedge ratio 906 for the selected cut which is used by the Purchasing Module 300, as is described below. Finally, at step 576, the model module 560 stores the curve as a model object 204 in memory 40 and/or in the tables 24 for further use by the tool 12.

In one embodiment, the prediction model 204 is an ordinary least squares regression model to predict future prices, though it will be appreciated that the portfolio management tool 12 may implement any model 204 that predicts the future prices of a selected cut of meat based on the available input data (i.e. the historic reported market prices of a product and the historic market prices of a security that relates to the product). An ordinary least squares regression model 204 is a method of finding the best curve fit for a data set, where the best fit is that instance of the model 204 for which the sum of the squared residuals is minimized. The residuals are the differences between an observed value and the value given by the model 204. In one embodiment, the model 204 is also self-correcting. The model module 560 compares the predicted price of a selected cut for each delivery period to the actual market price of the selected cut for the same period. The market price of the selected meat cut is provided to the module 560 from the data manager 34 which accesses the meat data provider 20. The module 560 calculates the difference between the predicted price and the market price of the selected cut (i.e. the error terms 206 in the predicted price) and modifies the internal structure of the model 204 by fitting a new curve for the model 204. In an embodiment, the module 560 fits a new curve for the model 204 on a real-time basis, as the market price of a selected cut of meat is available from the meat data provider 20. In yet another embodiment, the module 560 fits a new curve for model 204 at a pre-determined frequency (such as a month-by-month basis) by minimizing the squares of the error terms 206 that have become available since the last curve fit performed by the module 560 for the model 204.

In one embodiment, the model 204 takes the residuals (i.e. errors) from other models 204$a,b$ as inputs. Such a model 204 is a hybrid auto-regressive model because lagged residual terms from models 204,$a,b$ corresponding to previous months for the same cut of meat are included as a characteristic of the model 204. An autoregressive trend is one in which current results are affected by past results. Although the residuals are generally white noise (i.e. containing no predictive information), lagged residual terms from the models 204$a,b$ for previous months are reintroduced into the model 204 to form a hybrid auto-regressive multivariate model 204. The inclusion of residuals from models 204$a,b$ further develops the predictive ability of the model 204 by allowing the residuals from previous months to direct predictions for the price of the selected cut in the future. In this embodiment, inputting residuals into model 204 from models 204$a,b$ that correspond to delivery months immediately before the delivery month for the same cut (as selected by the member 8) gives the model 204 greater predictive accuracy. The ordinary least squares regression analysis of the model 204 can be represented by the following equation:

$$\text{Model: } Y = \beta X$$

$$\text{With solution } \hat{\beta} = (X^T X)^{-1}(X^T Y)$$

In matrix notation:

$$\begin{bmatrix} \hat{\beta}_0 \\ \hat{\beta}_1 \\ \vdots \\ \hat{\beta}_1 \end{bmatrix} = \begin{bmatrix} N & \sum X_{1,i} & \cdots & \sum X_{k,i} \\ \sum X_{1,i} & \sum X_{1,i}^2 & \cdots & \sum X_{1,i} X_{k,i} \\ \vdots & \vdots & \cdots & \vdots \\ \sum X_{k,i} & \sum X_{1,i} X_{k,i} & \cdots & \sum X_{k,i}^2 \end{bmatrix}^{-1} \begin{bmatrix} \sum Y_i \\ \sum Y_1 X_1 \\ \vdots \\ \sum Y_k X_k \end{bmatrix}$$

In the above equations, Y can represents the observed historical prices of the selected cut of meat for the selected delivery period, X represents a matrix containing the intercept, the value of live futures contracts and at least one residual error term, and $\hat{\beta}$ represents the vector of coefficient estimates. The vector of coefficient estimates contains the set of coefficients which detail how the predicted cash price is to be calculated given the observed data. The only variable in the above model 204 that is not controlled by the provider of the tool 12 is the value of the live animal futures contract.

Figure 8:
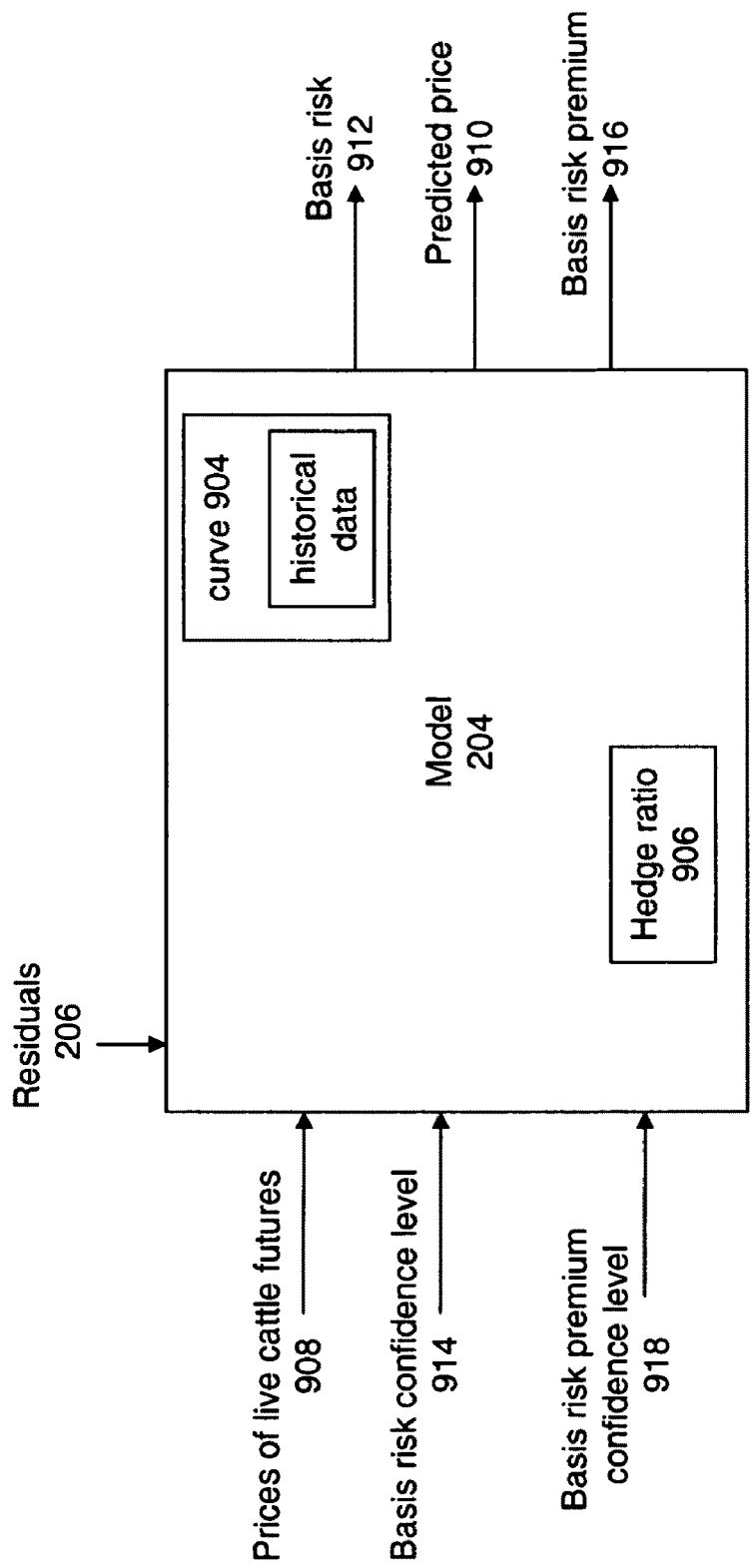
FIG. 8 is a block diagram of a model of the tool of FIG. 3.

Reference is next made to FIG. 8, which illustrates in black-box form the inputs that are received by a model 204 and the outputs that are produced by the model 204 when the model 204 is employed by the components of the tool 12. As mentioned above, the model 204 implements a linear regression analysis to predict the future price of a specific cut of meat for a selected future period. In its internal structure, the model 204 includes a curve 904 and a hedge relationship (e.g. ratio) 906. The curve 904 and the hedge ratio 906 are characteristics of the model 204 that are created by the model module 560 as described above. The hedge ratio 906 is determined by the model module 560 by analyzing the historic live cattle futures prices provided by the derivative data provider 18 and historic prices for the selected cut of meat provided by the meat data provider 20. The hedge ratio 906 is then used by the purchasing module 300 to determine the number of live futures to buy to minimize the risk of the provider of the tool 12 when the provider secures a future price for a selected cut of meat to the member 8. In an embodiment, the hedge ratio 906 is a ratio of the relative movements in the prices of the live cattle futures and the reported prices of the selected cut of meat. For example, the model module 560 may determine that for every three dollar increase in the price of life cattle futures, the price of a selected cut of meat historically increases by one dollar. Likewise, the model module 560 may determine that for every three dollar decrease in the price of live cattle futures, the selected cut of meat historically decreases by one dollar in price. In this embodiment, the provider of the tool 12 may wish to buy three live cattle futures for each unit of the selected cut when the provider of the tool 12 secures a forward price for the member 8.

As shown in FIG. 8, the model 204 takes real-time live futures prices 908 as an input, which are provided by the data manager 34 which retrieves the live futures prices 908 from the derivative data provider 18. The live futures prices 908 are used by the curve 904 to predict the future predicted prices 910 of the selected cut for the selected delivery period. The model 204 may also input at least one residual 206 as an input term as described above. The residuals 206 may be error terms for the model 204 for previously generated predictions 910 in the delivery month, or may be residuals 206 from other models 204a,b for the selected cut, but for previous delivery months. In an embodiment, the model 204 takes two residuals 206a,b: one residual 206a from a model 204a that corresponds to the selected cut but for a delivery period one month before the selected delivery period, and a second residual 206b from a model 204b that corresponds to the selected cut but for a delivery period two months before the selected delivery period.

As shown, the model 204 also generates a value for the basis risk 912. The term "basis risk" refers to the risk faced by the provider of the tool 12 and the member 8 that the actual market outcomes (i.e. the market price of a specific cut of meat) deviates from the future price 910 predicted by the tool 12. The provider of the tool 12 assumes the basis risk 912 in return for a customer paying a basis risk premium 916. The basis risk value 912 indicates the range of reasonably expected outcomes for analysis by the member 8 and the provider of the tool 12. The basis risk 912 is a monetary value based on a percentage of the predicted price 910 of a cut of meat and is based on the basis risk confidence level 914. The range is determined by the basis risk confidence value 914 which is inputted to the model 204 by the provider of the tool 12. As an example, the provider of the tool 12 may set the basis risk confidence level 914 to 97.5%. This means that the predicted prices 910 of the selected cut are expected to statistically fall within the range of the basis risk values 912 at a rate of 97.5% of the time. The provider of the tool 12 may set the basis risk confidence level 914 to any level desired. When a member 8 subscribes to a "premium" membership level, the member 8 is allowed to view the basis risk values 912 when they submit a prediction request as well as the basis risk premium 916. Members 8 that do not subscribe to the "premium" membership level are able to view the basis risk values 912 but not the associated premium 916 as these customers are not given permission to secure predicted prices in the future.

The model 204 also generates a basis risk premium 916. The basis risk premium 916 is the amount of money that the member 8 can pay to the provider for the provider of the tool 12 assuming the basis risk 912 when the provider secures a predicted future price 910 for the selected cut to the customer 8. The amount of the basis risk 912 (and hence the amount of the basis risk premium 916) varies by cut of meat and by month. The basis risk premium 916 is a monetary value that corresponds to a percentage of the predicted price 910 and is dependent on the basis risk premium confidence level 918 that is chosen by the provider of the tool 12 that is an input to the model 204. For example, the provider of the tool 12 may set the basis risk premium confidence level 918 to 80%. It is understood that the predicted future price 910 is on a 50% confidence level since there is a 50% chance that the actual price will be lower than the predicted price 910, and a 50% chance that the actual price will be higher than the predicted future price 910. The difference between the basis risk premium confidence level 918 and the confidence level of the predicted price 910 determines the amount of the basis risk premium 916. In the above example (i.e. where the basis risk premium confidence level 918 is set to 80%) the member 8 can pay a basis risk premium 916 equal to a 30% risk off the forecasted price 910 and the provider of the tool 12 will assume the basis risk 912 on behalf of the customer 8.

Although the basis risk confidence level 914 and the basis risk premium confidence level 918 are inputs to the model 204, is to be understood that these values are controllable by the provider of the tool 12. For example, the provider of the tool 12 may manage its internal risk in guaranteeing the forward prices of cuts of meat to customers 8 by modifying the confidence levels 914, 918. The only uncontrollable input to the model 204 is the price of live cattle futures 908 which gives the provider of the tool 12 significant flexibility in managing its risk over time by modifying the confidence levels 914, 918.

Predictor Module 200

Figure 9:
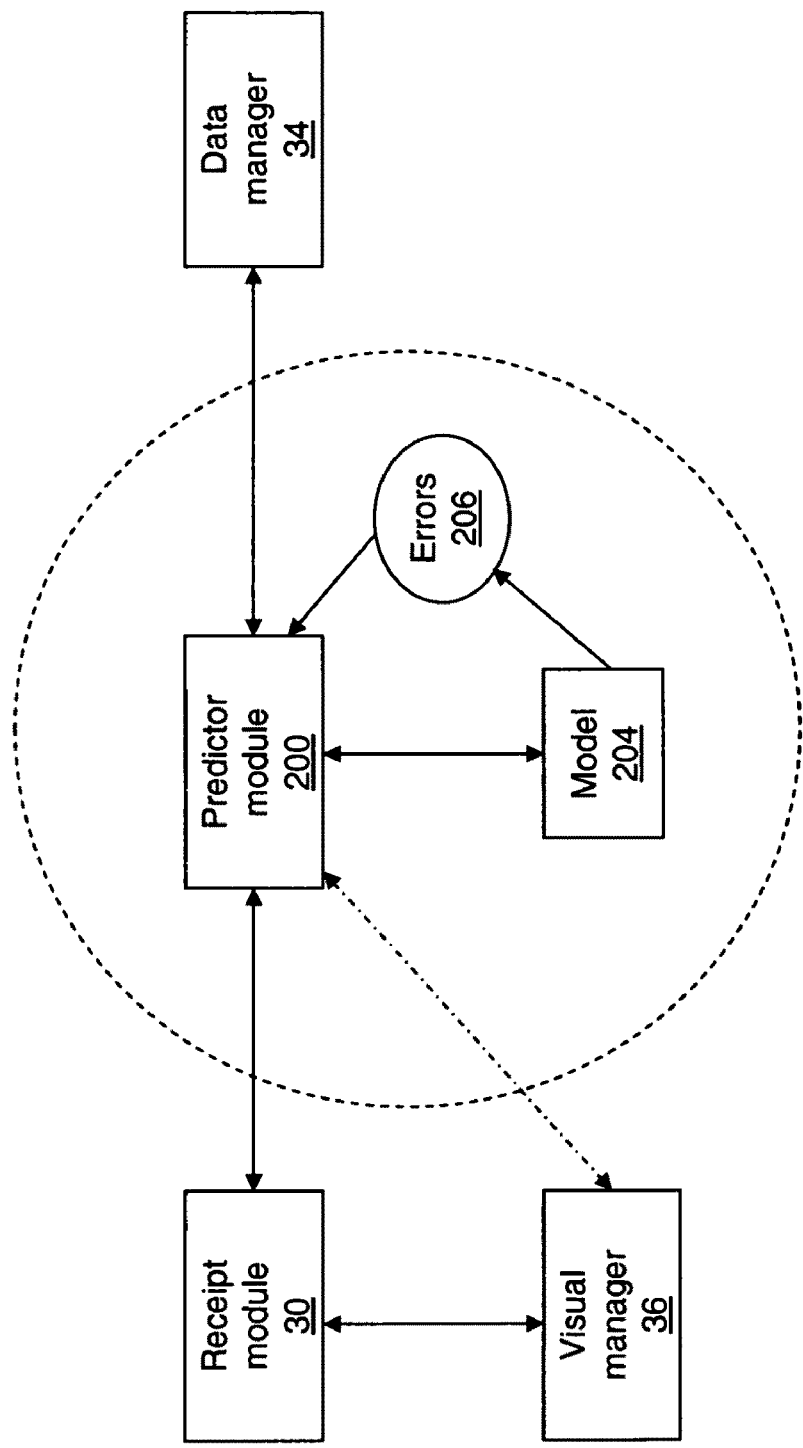
FIG. 9 shows a predictor module of the portfolio management tool of FIG. 3.

Reference is next made to FIG. 9, which illustrates the Predictor Module 200 of the tool 12. The Predictor Module 200 is operable to predict future prices 910 for a selected cut of meat for a selected delivery period as chosen by the member 8. For example, the member 8 may wish to view the predicted prices 910 of a rib-eye steak for every month in the next 12-month period. Alternatively, the member 8 may wish to view the predicted price 910 of a pound of ground beef for a specific month, for example, December 2010. As shown, the Predictor Module 200 receives a request by the receipt module 30 and retrieves data from the meat data provider 20 and the derivative data provider 18 via the data manager 34. The module 200 interfaces with a prediction model 204 which is a set of instructions for processing inputs to the model 204 and for generating a set of future prices 910 for the selected cut of meat. The module 200 applies the data received from the provider 18 an input to the model 204 and generates the basis risk 912, predicted future prices 910 and the basis risk premium 916 as described above.

It will be understood that there is a risk that the prediction model 204 will not perfectly predict the future price 910 of a selected cut of meat. When a member 8 chooses to secure a future price 910, the provider of the tool 12 assumes the risk (i.e. the basis risk 912) that the predictions 910 will not be correct. The basis risk 912 will be different for each selected cut of meat and for each delivery period. In exchange for assuming the basis risk 912, the provider of the tool 12 charges a basis risk premium 916, which is similar to an insurance premium that is to be paid by the member 8. Generally, the basis risk premium 916 is a fraction of the predicted price of a selected cut of meat, which gives the member 8 an opportunity to receive price stability for an additional price premium.

When a user 8 requests a prediction 910 for a selected cut of meat for a selected delivery period, the receipt module 30 communicates the prediction request to the module 200 which employs the prediction model 204. The member 8 selects the cut of meat and the delivery period by interacting with controls on the user interface 28 and by submitting the request to the portfolio management tool 12. The receipt module 30 communicates the selected cut and delivery period to the module 200 which accesses the appropriate prediction model 204 from the data manager 34. The model 204 may implement an ordinary least squares regression model, as described above, or the model 204 may implement any number of different numerical techniques. In one embodiment, the model 204 may be interchangeable and customizable based on the wishes of the member 8 and/or the provider of the tool 12. The model 204 runs a set of instructions to generate prediction data and provides the prediction data to the module 200. The module 200 communicates the prediction data to the receipt module 30 which instructs the visual manager 36 to render the prediction data in a prediction table 220 for further viewing and interaction by the member 8. The module 200 may also communicate directly with the visual manager 36 to render the prediction table 220 to the user interface.

The predictor module 200 may also have the capability to dynamically generate predictions at a predetermined frequency. In an embodiment, the predetermined frequency is customizable by the member 8. For example, the predictor module 200 may generate prediction data for the selected cut and delivery period every minute, every second or on a real-time basis. The module 200 retrieves the applicable input data from the data manager 34 at the predetermined frequency and communicates the input data to the model 204. The model 204 processes the input data based on a set of instructions and creates prediction data which is communicated to the module 200 for rendering as the prediction table 220 on the visual representation 28.

Figure 10:
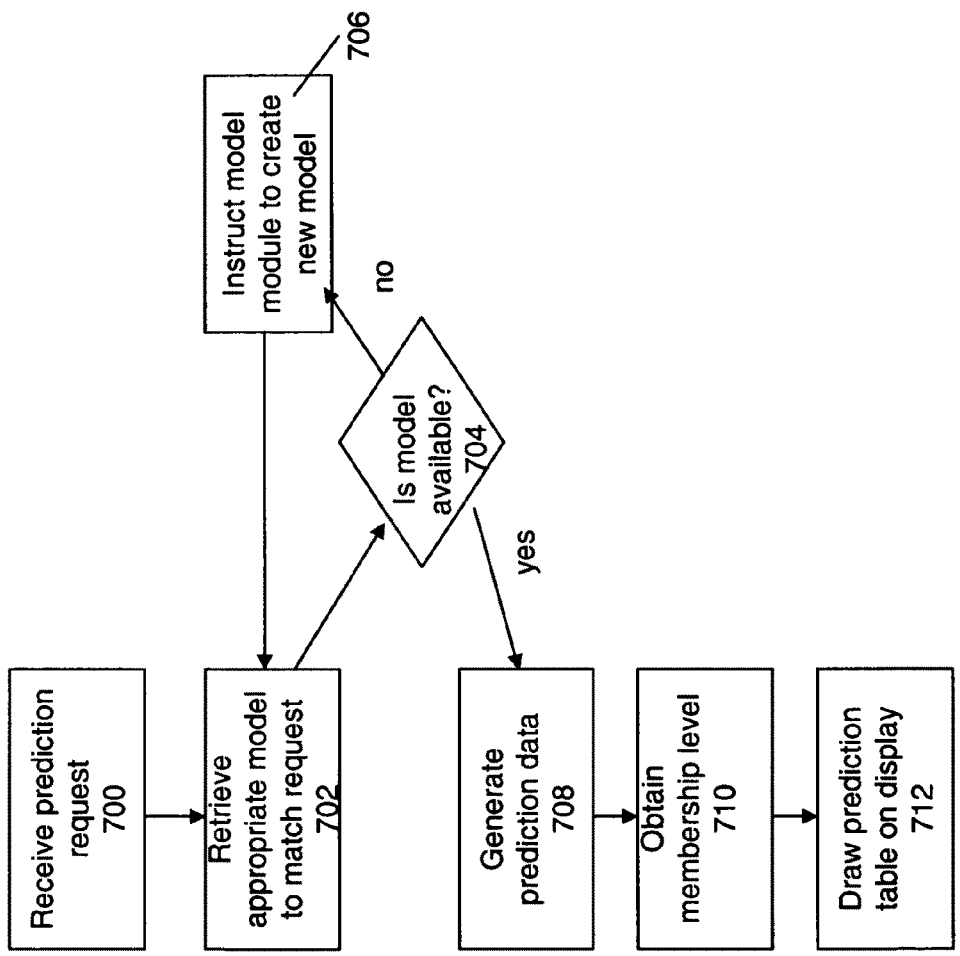
FIG. 10 is a flow-chart of the steps performed by the predictor module of FIG. 9.

Reference is next made to FIG. 10, which illustrates the series of steps the predictor module 200 carries out when a prediction request is made by a member 8. At step 700, the predictor module 200 receives the prediction request via the receipt module 30. At step 702, the predictor module 200 retrieves the appropriate model 204 for the selected cut and delivery month via the data manager 34 or directly from memory 40. At step 704, the module 200 determines whether a model 204 was successfully retrieved at the previous step 702. If a model 204 is successfully retrieved, the module 200 generates prediction data 910 at step 708 for presentation as the visual representation 28 by the visual manager 36. If the model 204 is not successfully retrieved at step 702, the module 200 instructs the model module 560 to generate a new model 204 for the selected cut at step 706 and the module 200 goes back to step 702. At step 710, the prediction module 200 obtains the permission or membership level of the member 8 from memory or the tables 24. Finally, at step 712, the prediction module 200 instructs the visual manager 36 to create a prediction table 220 that is customized to the permission level of the member 8 and to render the prediction table 220 on the visual interface 28 for viewing and possible further interaction by the member 8.

Prediction Tables 220

Figure 11A:
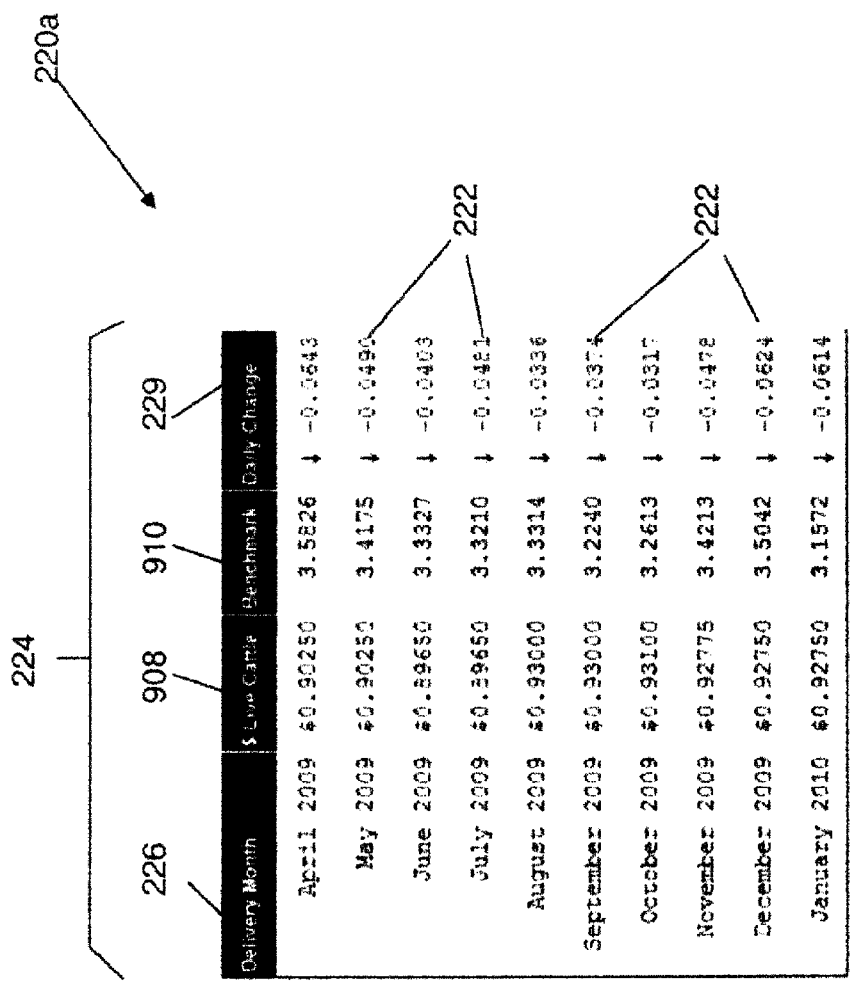
FIG. 11a is an exemplary prediction table displayed to a user of the portfolio management tool of FIG. 1.

Reference is next made to FIG. 11a, which illustrates a prediction table 220a which is displayable on the user interface 28. The prediction table 220a is operable to display the prediction data created by the prediction model 204 in a convenient format for analysis by the member 8. As shown, the prediction table 220a includes prediction rows 222 and columns 224. Each row 222 represents the prediction price 910 for the selected cut of meat for each month 226 in the selected delivery period and associated information. In the exemplary prediction table 220a, the member 8 has requested to view prediction data for each month from April 2009 until January 2010 by interacting with controls (not shown) on the visual interface 28. The predictor module 200 instructs the model 204 to create prediction data and communicates the prediction data to the visual manager 36 for rendering the results in the prediction table 220a. The table 220a is updated by the visual manager 36 at the predetermined frequency as chosen by the member 8 or in real-time. As is apparent, the member 8 can view the following data: the delivery month 226, the price of live cattle futures contracts 908 for each month 226 in the delivery period, the predicted price 910 of the selected cut of meat for each month 226 in the delivery period, and the daily change 229 in the predicted price 910 for the selected cut of meat. The member 8 is restricted in which data is viewable on the visual representation 28 because the member 8 does not have full membership privileges as described above with reference to FIG. 4. In an embodiment, the member 8 is able to view additional information such as the basis risk 912 without having a premium membership as shown in FIG. 12a.

Reference is next made to FIG. 11b, which illustrates an exemplary prediction table 220b presented to the member 8 on the visual representation 28. As shown, the prediction table 220b contains all of the information of the prediction table 220a in FIG. 11a, as well as other information that provides a valuable analytical tool to the member 8. The member 8 makes a prediction request to the tool 12 by interacting with controls (not shown) on the visual representation 28. Prediction data is generated by the predictor module 200 by employing a prediction model 204 and is presented on the visual representation 28 as prediction table 220b by the visual manager 36. The prediction table 220b also includes information related to the basis risk 912 of the predicted prices 910 and the basis risk premium 916 (indicated by the text "BRP") that the member 8 can choose to pay in exchange for securing the prices 910 for any delivery month 226. In exchange for paying the basis risk premium 916, the provider of the tool 12 assumes the financial risk for the basis risk 912 associated with the predictions 910 (i.e. the risk that the predicted future prices 910 are not correct). The prediction table 220b also includes the Up Market Risk 248 and the Down Market Risk 250. As is apparent, the Up Market Risk 248 is the risk that the market price of the selected cut will be higher than the predicted prices 910 by the amount of the basis risk 912 at prevailing (i.e. current) live cattle futures values. The Down Market Risk 250 is the risk that the market price of the selected cut will be lower than the predicted prices 910 by the amount of the basis risk 912 at prevailing (i.e. current) live cattle futures values. The range between the Up Market Risk 248 and the Down Market Risk 250 (e.g. 3.8991−3.2662=$0.663 in row 241) is the risk that the provider of the tool 12 is willing to assume in exchange for the member 8 paying the associated basis risk premium 916. As mentioned above, the provider of the tool 12 may adjust the basis risk confidence level 914 to any desired level to increase or decrease the risk represented by the range between the Up Market Risk 248 and the Down Market Risk 250. It is recognised that the basis risk can be determined by a defined comparative relationship, such as but not limited to a difference.

Reference is made to FIG. 12a, which shows a visual representation 28 that is presented to a member 8 when the member 8 selects a cut of meat for which to generate predicted future prices 910. As shown, the visual representation 28 includes a prediction table 220 for displaying the predicted prices 910 to the member 8, a selection menu 502 for allowing the member 8 to select a cut of meat 506 for which to generate predicted future prices 910, and a chart 504 for allowing the member 8 to analyse the risk inherent in the predicted future prices 910. The member 8 has selected the cut 506 from the selection menu 502, for example, by clicking on the cut 506 with a mouse cursor or using another input device 38. Once the member 8 selects the cut 506, the receipt module 30 instructs the predictor module 200 to generate the prediction table 220 and the chart 504. As described above, the predictor module 200 retrieves the input data via the data manager 34 and creates a prediction data set. The predictor module 200 then instructs the visual manager 36 to create and display the visual representation 28 to the member 8. As shown, the chart 504 includes a prediction line 508 which illustrates the predicted prices 910 of the selected cut 506 over the time axis 510. Also, the chart 504 displays a risk band 512 to the user 8 which represents the range of reasonably expected outcomes of the predicted prices 910. The risk band is a visual representation of the basis risk 912 in the predictions 910. As described above, the basis risk 912 is defined by threshold values (i.e. the basis risk confidence level 914) that are customizable by the provider of the tool 12 and/or the member 8. As an example, the risk band 512 may represent a 97.5% confidence level 914, meaning that based on the internal structure of the model 204 (which has been created to represent the relationship between the historical prices of the selected cut 506 and the historical prices of live cattle futures 908), the predicted future prices 910 will fall within the risk band 512 97.5% of the time. The basis risk 912 can be modified to any confidence level 914 depending on the wishes of the provider and/or the member 8.

Figure 12B:
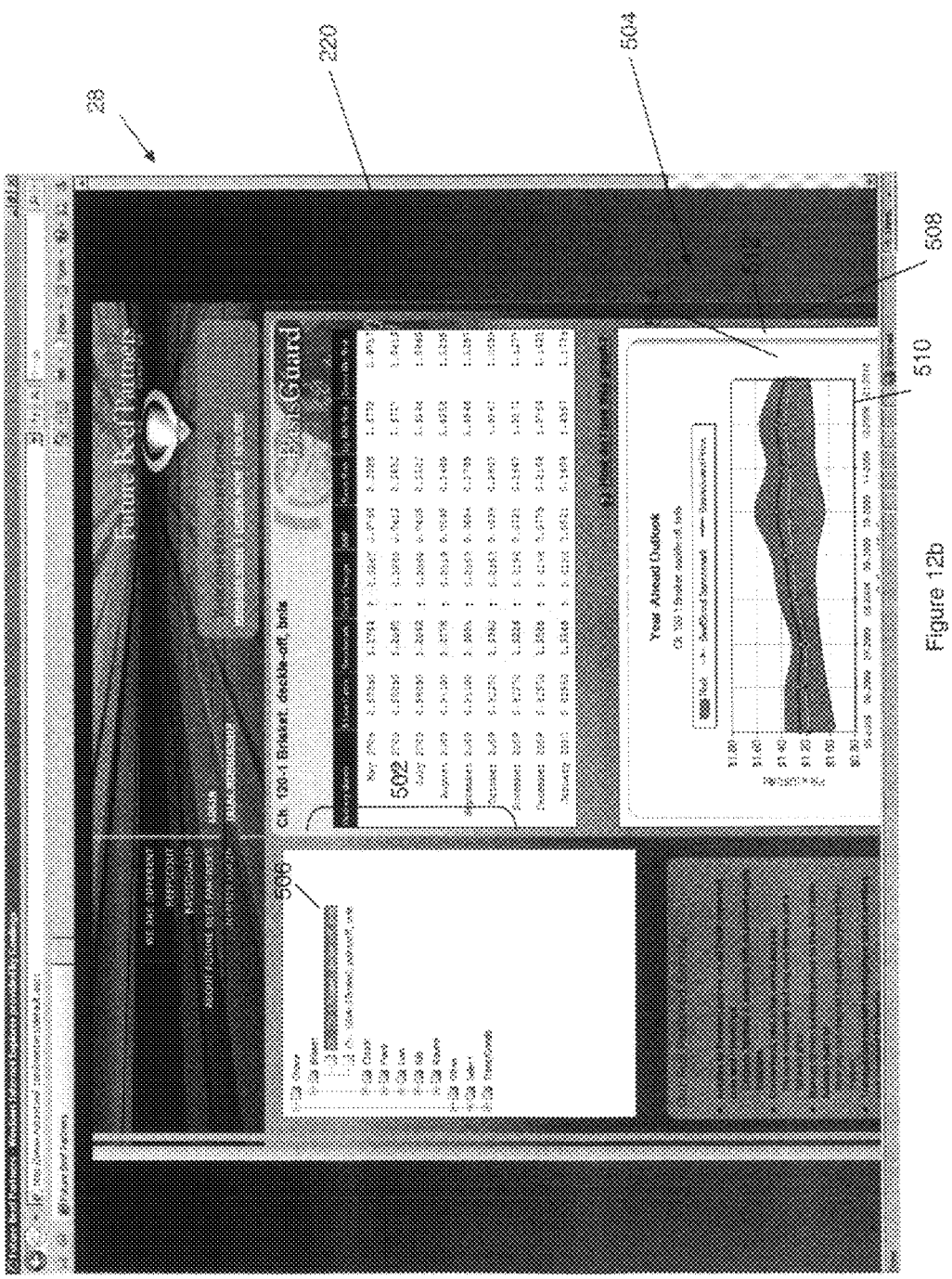
FIG. 12b is an alternative exemplary visual representation displayed to a user of the portfolio management tool of FIG. 1.

Reference is next made to FIG. 12b, which illustrates a visual representation 28 which is presented to the member 8 when the member 8 selects a cut of meat 506 for which to generate predictions of the futures prices 910 of the selected cut 506. As shown, the chart 504 includes a prediction line 508 for visualizing the predicted price 910 of the selected cut 506 over the time axis 510. The chart 504 includes a risk band 512 for visualizing the range of reasonably expected future prices and also includes an insurance premium line 514 that enables the member 8 to view how much the basis risk premium 916 will cost the member 8 if the member 8 wishes to secure the future price 910 of the selected cut 506. The basis risk premium 916 is determined by the model 204 to be the difference (or other appropriate comparative relationship) between a basis risk premium confidence level 918 and the 50% confidence level of the predicted future prices 910. As described above, the basis risk premium confidence level 918 is an input to the model 204 that may be controlled by the provider of the tool 12. As an example, the basis risk premium confidence level 918 can be set to 80% by the provider of the tool 12. This means that the provider has determined that there is an 80% probability that the predicted future price 910 of the selected cut 506 will fall within the range represented by the basis risk premium confidence level 918. In exchange for paying the basis risk premium 916, the provider of the tool 12 assumes the risk that the predicted future prices 910 will not fall within the basis risk premium confidence level 918.

It is to be understood that in other embodiments of the invention, the tool 12 may show any or all of the information shown in the prediction tables 220 of FIGS. 11a, 11b and FIGS. 12a, 12b to a member 8. For example, the provider of the tool 12 may wish to allow all members 8 to see the information in FIG. 12b. However, for example in other embodiments, the provider of the tool 12 may wish to display only the predicted future prices 910 to a member 8.

Purchasing Module 300

Figure 13:
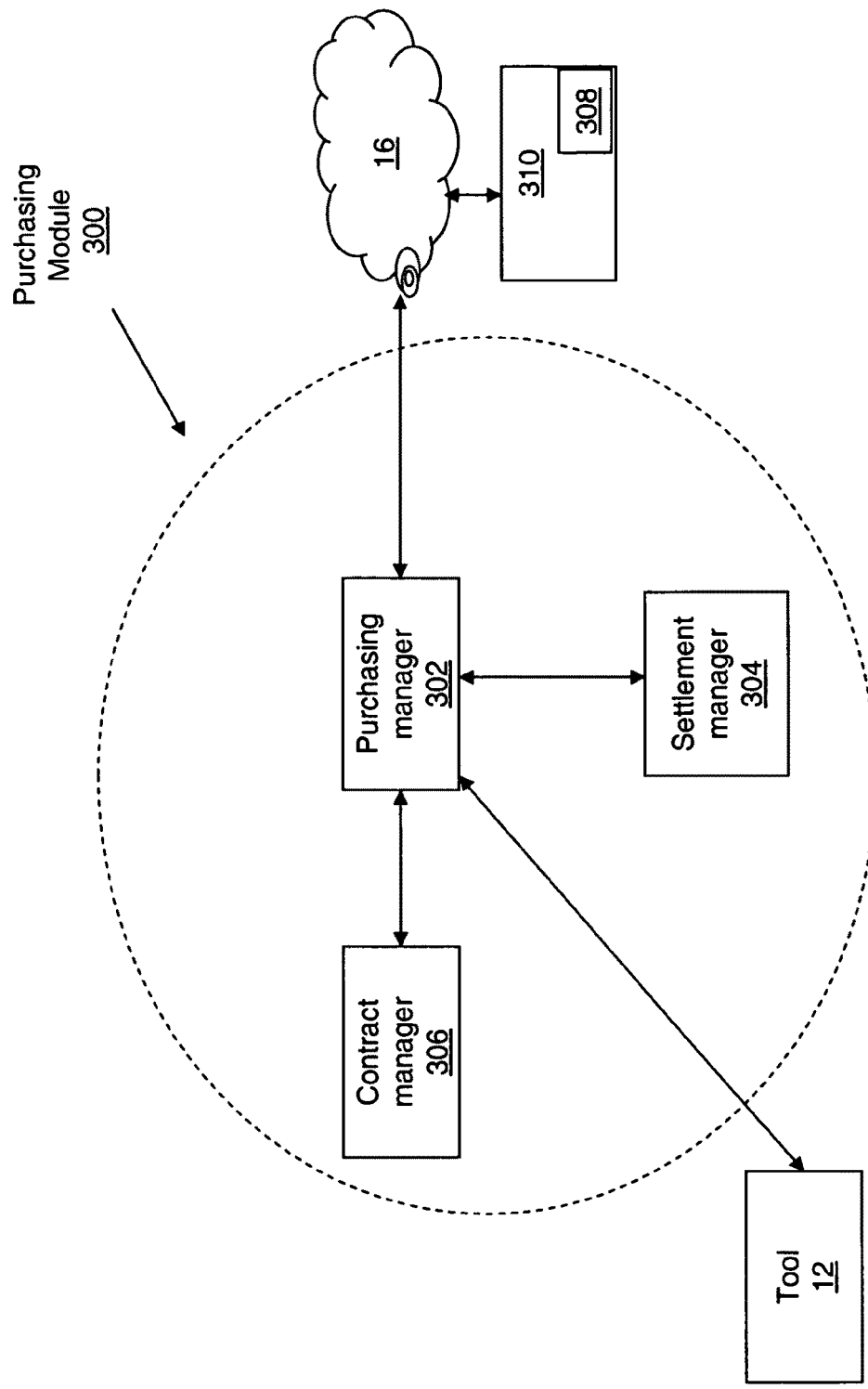
FIG. 13 shows a purchasing module of the portfolio management tool of FIG. 3.

Reference is next made to FIG. 13, which illustrates the Purchasing Module 300 of the Portfolio Management Tool 12. As shown, the purchasing module 300 includes a purchasing manager 302 for managing purchase requests for a quantity of the selected cut of meat 506 and for managing the buying and selling of live animal futures contracts throughout the duration of the purchasing contracts. The purchasing module 300 allows a member 8 to secure a price 910 for a quantity of a desired cut 506 of meat. The member 8 is provided the predicted price 910 by the provider of the portfolio management tool 12 for the duration of the contract defined by the delivery period. A member 8 can initiate a purchase request by interacting with controls (not shown) on the visual interface 28. The controls are operable to receive at least three types of information from the user 8, namely, a cut of meat desired 506, the delivery period and the quantity of the cut of meat. When the member 8 initiates the purchase request (for example, by clicking on a submit purchase request button (or by communicating instructions to the provider of the tool 12), the receipt module 30 communicates the request to the purchasing manager 302 for further processing. It will be appreciated that the member 8 may send written instructions in an email or in another format, or may communicate instructions verbally with the provider of the tool 12. Additionally, the member 8 may have predetermined instructions for the provider of the tool 12 to take certain actions on the happening of certain events, such as when the predicted future prices 910 of a selected cut 506 are above or below a predetermined level (e.g. recorded in the memory of the tool 12). The purchasing manager 302 is in communication with the predictor module 200 and requests specific information from the module 200. Specifically, the purchasing manager 302 may request information relating to the number of futures contracts to buy to manage the risk associated with providing the predicted price 910 of the selected cut 506 to the member 8. The model 204 provides the information as a hedge ratio/relationship 906 on request to the receipt module 30 which relays the information back to the purchasing manager 302. In another embodiment, the information is stored in the tables 24 and the purchasing manager 302 is able to retrieve the information via the data manager 34. The purchasing, manager 302 is operable to execute trades (i.e. to buy and sell) futures contracts on a trading system 308 of a futures market 310. The trading system 308 may be provided by the operator of the futures market 310 or may be a system provided by a third party as is known. Upon receipt of the number of futures contracts to buy (information provided by the model 204 as described above) the purchasing manager 302 buys the required number of futures contracts.

As described above, the prediction model 204 produces a hedge ratio 906, which represents the relationship between the movement in the market price of a futures contract and the associated movement in the price of the selected cut of meat 506. The hedge ratio 906 determines the amount of futures that the provider purchases to hedge against the risk associated with providing the predicted future predicted price 910 of the selected cut 506 to the member 8. In one embodiment, the hedge ratio 906 is expressed in pounds (or another unit of weight). As an example, a provider of the tool 12 is willing to provide a future price to a customer on 100,000 lbs of rib-eye steaks and the model module 560 determines that the hedge ratio 906 of the model 204 (i.e. the model 204 for rib-eye steaks for the selected month) to be 2.8. In this example, the purchasing module 300 will purchase a quantity of live cattle futures contracts that corresponds to a weight of live cattle equal to 2.8 times the weight of rib-eyes (i.e. the selected cut of meat). As is known, there are 40,000 lbs of live cattle for every live cattle futures contract. In this example, the purchasing module 300 buys 7 live cattle futures contracts which correspond to 280,000 lbs of live cattle which provides a hedge ratio of 2.8 (i.e. 280,000 lbs of live cattle for 100,000 lbs of rib-eye steaks).

In one embodiment, the purchasing module 300 includes a settlement manager/module 304 for selling or "unwinding" the provider's portfolio of futures contracts. The settlement manager 304 is operable to sell the futures contracts in an optimal fashion over the course of the delivery month. In an embodiment, the provider of the tool 12 buys live cattle futures that have the closest settlement month that is after the delivery month of the cut of meat. In practice, live cattle futures may only be available for even months (i.e. February, April, June, etc). If a customer 8 wants December rib-eyes, the provider buys futures for February of the next year. If the customer wants to buy March rib-eyes, however, the provider buys April live cattle futures. In an embodiment, the settlement manager 304 sells the quantity of futures contracts in a distributed fashion in periodic (e.g. weekly) increments over the course delivery period (e.g. month) of the cut of meat (for example not the settlement month of the live cattle futures). For example, if the provider of the tool 12 is holding 16 futures contracts to hedge against price movements for a cut of meat that has a particular delivery month, the provider may choose to sell 4 futures each week during each week of the delivery month to minimize the risk of selling the futures at a low point during the month. In another embodiment, the provider buys live cattle futures with a settlement month the same as the delivery month of the cut of meat, if available, and for the nearest settlement month after the delivery month if live cattle futures are not offered for the selected delivery month.

The purchasing module 300 may also include a contract manager/module 306 for managing contracts between the member 8 and the provider of the portfolio management tool 12. As will be appreciated, each time a member 8 chooses to secure the future prices 910 of a selected cut of meat 506, the provider of the tool 12 agrees to provide the predicted future price 910 for the selected cut of meat and the selected delivery month which creates a contract between the member 8 and the provider of the tool 12. The contract manager 306 is operable to manage the recordation and execution of the terms of the contract that is entered into between the member 8 and the provider of the tool 12. It will also be appreciated that each individual member 8 may enter into a number of contacts with the provider of the tool 12. The contract manager 306, for example, is operable to store the terms of each contract and party-specific information in the tables 24. The contract manager 306 is adapted to instruct the purchasing manager 302 to sell or unwind futures contracts in each delivery month.

Figure 14:
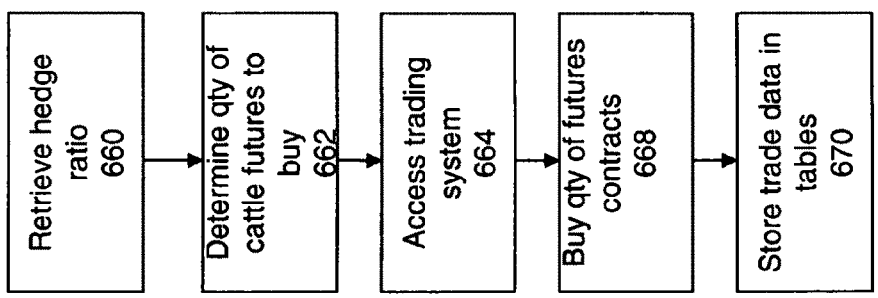
FIG. 14 is a flow-chart of the steps performed by the purchasing module of FIG. 13.

Reference is next made to FIG. 14, which illustrates the series of steps performed by the purchasing manager 302 when a member 8 chooses to lock in the predicted future prices 910 for a selected cut of meat 506 for a selected delivery period. At step 660, the purchasing manager 302 retrieves the hedge ratio 906 from the prediction model 204 via the predictor module 200. The hedge ratio 906 is used by the purchasing manager at step 662 to determine the quantity of live cattle futures to purchase to hedge against future price movements in the selected cut. At step 664, the purchasing manager 302 accesses a trading system 308 on a futures market 310 and buys the appropriate number of futures at step 668. Finally, at step 670, the purchasing manager 302 instructs the data manager 34 to record the number of futures purchased, the price paid for the futures, the type and quantity of the cut of meat and the selected delivery month in the tables 24 or directly in memory 40.

Alternative Embodiment of the Tool 12

Figure 15:
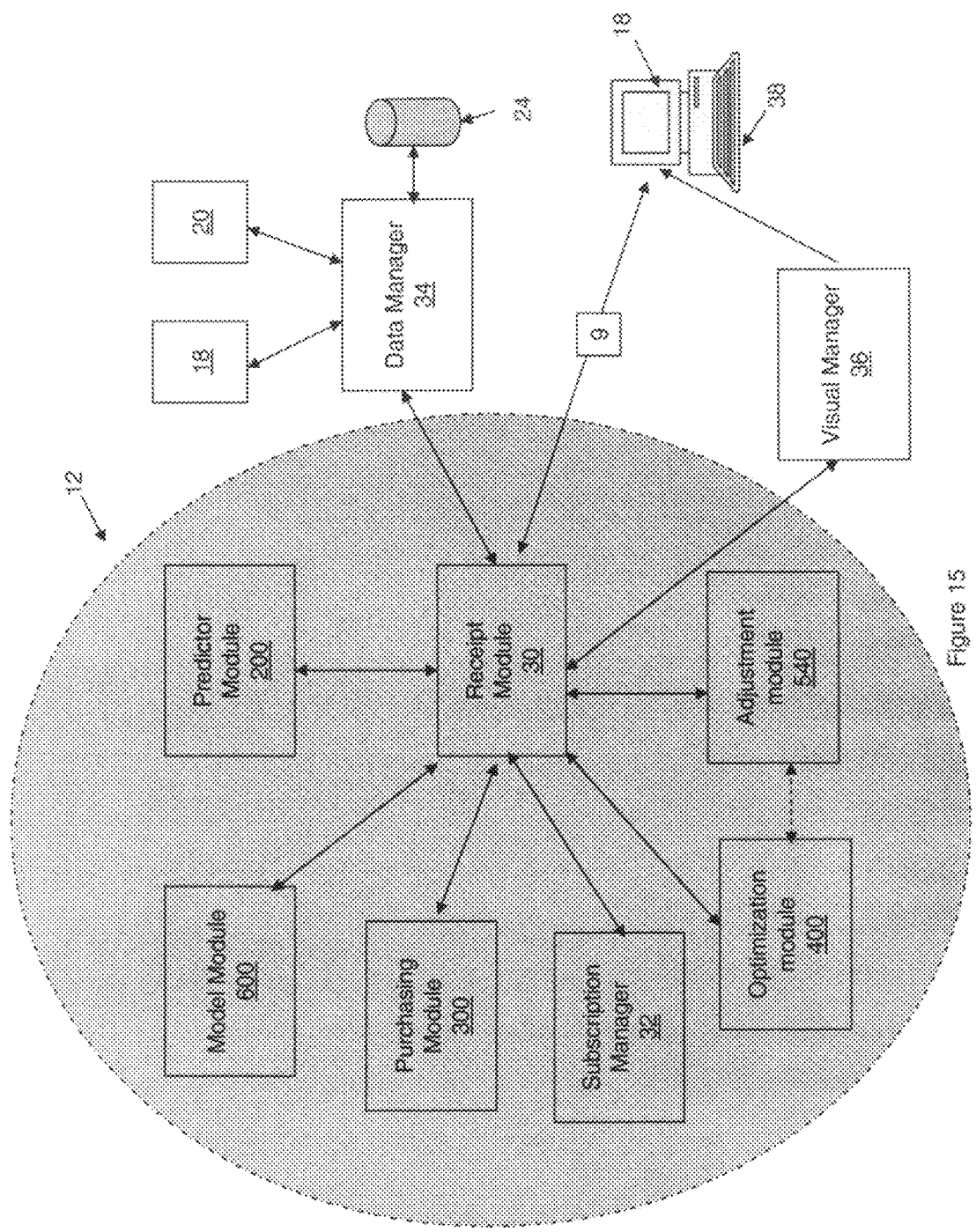
FIG. 15 is an alternative embodiment of a portfolio management tool of FIG. 1.

Reference is next made to FIG. 15, which shows a component diagram of an alternative embodiment of the portfolio management tool 12. In addition to the functionality described above, the portfolio management tool 12 is operable to lower the overall risk of the aggregate portfolio 960 of the provider of the tool 12 as the provider guarantees forward prices of various cuts of meat to customers 8. As shown, the management tool 12 includes a receipt module 30 for managing user requests 9 and for directing user requests to one or more of the appropriate modules 32, 200, 300, 400, 540 and/or 560. As the member 8 interacts with the visual representation 28 via input devices 38, the receipt module 30 co-ordinates the responsibilities and tasks of the other modules 32, 200, 300, 400, 540 and/or 560 of the management tool 12. The management tool 12 communicates with a data manager 34 which is operable to retrieve data from and send data to the tables 24 upon instruction from the receipt module 30 and/or the other components of the tool 12. The data manager 34 is also in electronic communication with the derivative data provider 18 and the meat data provider 20. The visual manager 36 is instructed by the components of the management tool 12 to recreate and redraw the visual representation 28 for viewing and further interaction by the user or member 8. The tool 12 includes a model module 560 for creating the model(s) 204 of the portfolio management tool 12. As described below, the model module 560 is operable to create an models 204 for representing each cut of meat and each corresponding delivery time period that is offered to the member 8 by the tool 12. The model module 560 instructs the data manager 34 to store each model 204 in the tables 24 or directly into memory 40 of the electronic device 18 for use by the other components of the tool 12. The tool 12 also includes a predictor module 200 which is operable to generate the future predicted prices of a cut of meat for a selected period upon selection by the user 8. The predictor module 200 is in communication with and retrieves the appropriate model from the model module 560. The predictor module 200 uses the model 204 to create a prediction table 220 and instructs the visual manager 36 to render the prediction table 220 to the visual interface 28 for viewing and interaction by the member 8. The tool 12 also includes a Purchasing Module 300 for buying and selling live cattle futures contracts on a futures market 310. The purchasing module 300 retrieves a hedge ratio 906 from the model module 560 and determines the number of live cattle futures to buy. Once the number of live cattle futures is determined by the purchasing module 300, components of the purchasing module 300 buy the appropriate number of live cattle futures determined by the hedge ratio 906 and store the information regarding the trade in the tables 24 via the data manager 34. The tool also includes a subscription manager 32 for managing the member accounts of the members 8 and for instructing the visual manager 36 the type of information to display to the member 8 and the types of interaction that the member 8 has permission to perform. In addition, the tool 12 includes an optimization module 400. The optimization module 400 is for calculating correlation factors for each pair of assets in the aggregate portfolio 960 and for creating optimization decisions 404. The decisions 404 are used by the adjustment module 540 to alter the internal structure of the models 204 to make some cuts of meat more attractive (i.e. less expensive) relative to other cuts of meat (which may be made more expensive) for customers 8 and potential customers of the tool 12. The adjustment module 540 may communicate adjustment parameters to the model module 560 which modifies the appropriate model 204 upon instruction by the adjustment module 540. Alternatively, the adjustment module 540 directly modifies models 204 to put some cuts of meat on sale and to increase the prices of other cuts of meat. By continually generating optimization decisions 404 and modifying the internal structure of models 204, the risk associated with guaranteeing forward prices of cuts of meat in an aggregate portfolio 960 is continually being monitored and optimized for the provider of the tool 12.

Aggregate Portfolio 960

Figure 16:
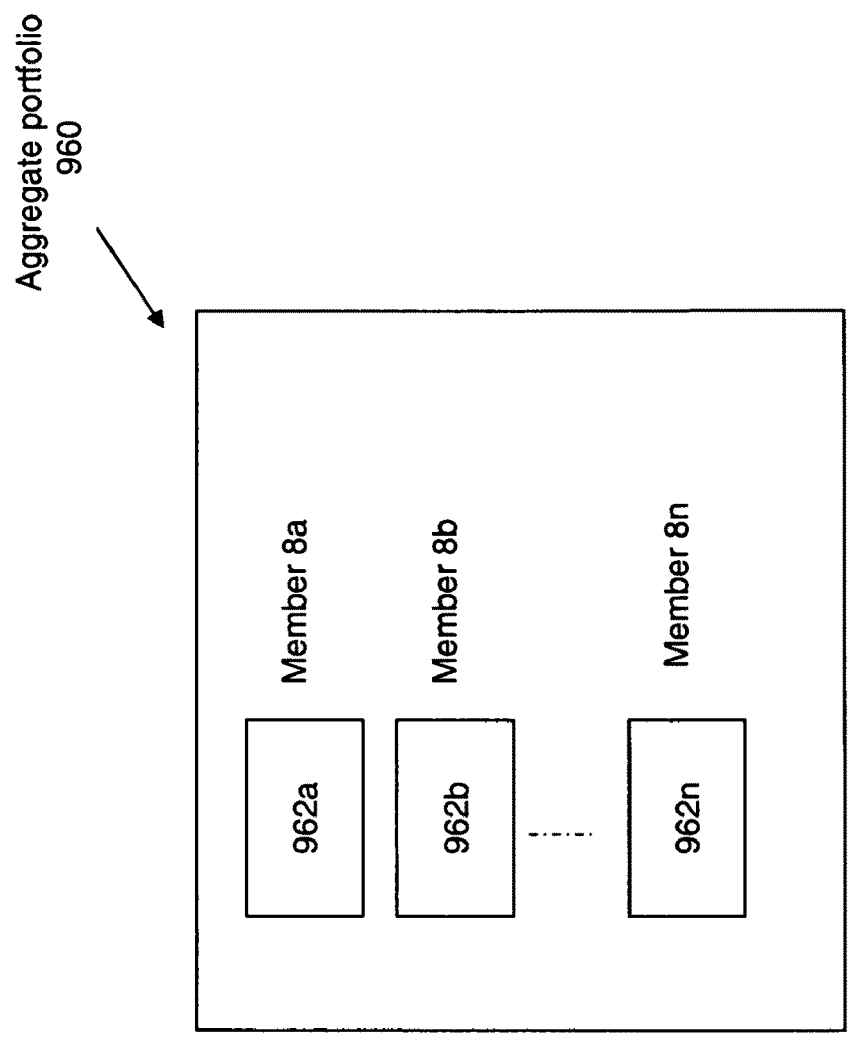
FIG. 16 shows an aggregate portfolio of the provider of the portfolio management tool of FIG. 15.

Reference is next made to FIG. 16, which illustrates an aggregate portfolio 960 of the provider of the tool 12. The aggregate portfolio 960 includes customer portfolios 962*a-n* which are held by the members 8*a-n*. The aggregate portfolio 960 therefore includes all cuts of meat for each delivery period for each customer 8 of the tool 12. The provider of the tool 12 is exposed to risk by securing the forward prices 910 of the cuts of meat in the portfolios 962*a-n* for each of the customers 8*a-n*. It will be appreciated that the provider of the tool 12 is desirous of lowering its overall risk exposure of the aggregate portfolio 960 while still profiting from offering the services of the tool 12.

Optimization Module 400

Figure 17:
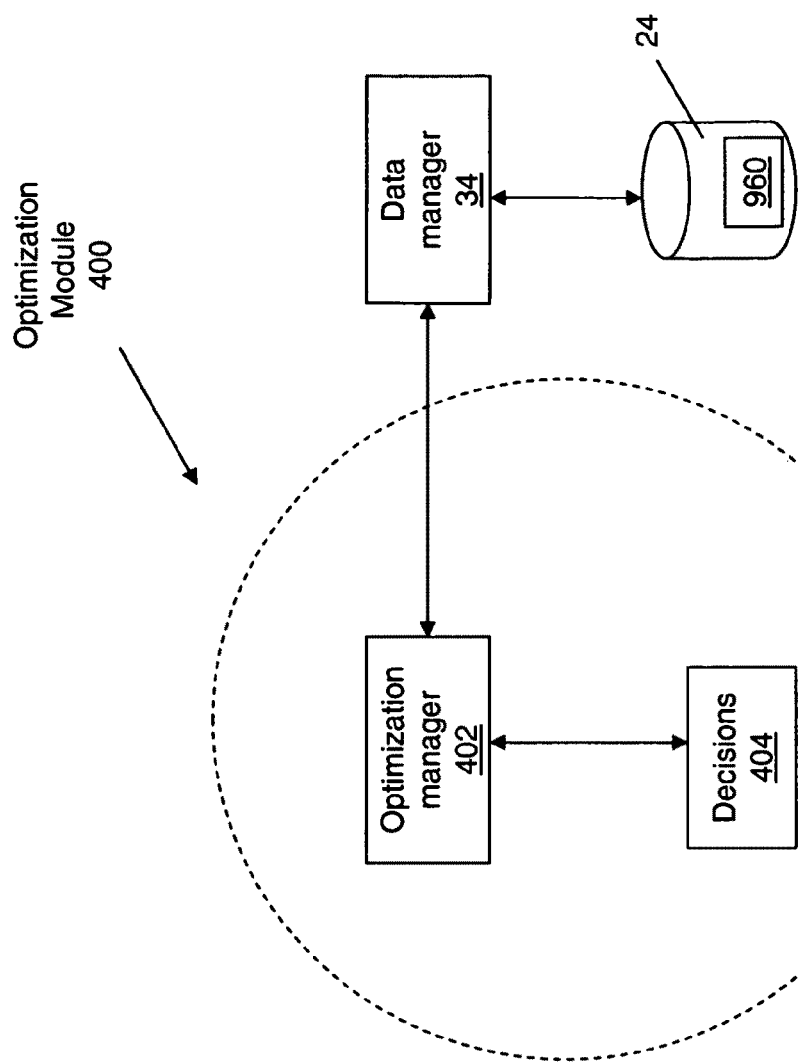
FIG. 17 is an optimization module of the portfolio management tool of FIG. 15.

Reference is next made to FIG. 17, which illustrates a Portfolio Optimization Module 400 of the management tool 12. The portfolio optimization module 400 includes an Optimization manager 402 which is operable to generate optimization decisions 404 based on the aggregate portfolio content 960 resident in the tables 24. The optimization manager 402 performs statistical analysis on the relationship between historic market prices of pairs of cuts of meat in the portfolio. The optimization decisions 404 are designed to reduce the risk of the provider of the portfolio management tool 12 in securing the predicted future prices 910 of selected cuts of meat 506 for selected delivery periods. For example, the manager 402 may calculate that based on historical data, one cut of meat is negatively correlated with another cut of meat in the same month, for example meaning that one cut of meat is found to historically increase in price while another cut of meat historically decreases, such that the variation in the historical prices represents price variation in the historical prices. This negative correlation also means that the price variation of one meat cuts is opposite to the price variation of the other meat cut (e.g. one meat cut price increases while the other meat cut price decreases).

The manager 402 then generates decisions 404 that are implemented by modules of the tool 12 to increase the quantity of one or both cuts of meat in the portfolio 960, thus lowering the overall risk of the portfolio 960 as is known. Likewise, the manager 402 may generate decisions 404 to decrease the quantity of positively correlated cuts in a portfolio 960. The optimization manager 402 may periodically generate optimization decisions 404 at a predetermined frequency or the optimization manager 402 may dynamically generate decisions 404 on a real-time basis as the content of the aggregate portfolio 960 is modified (i.e. as members 8 choose to secure the future prices 910 of selected cuts 506 in exchange for paying the basis risk premium 916 and/or as the delivery periods of selected cuts 506 expire). In an embodiment, the manager 402 generates decisions 404 to alter the models 204, for example, to lower the basis risk premium charged on a cut of meat, effectively putting the cut of meat on sale. In addition, the decisions 404 may be used by employees of the provider of the tool 12 to target certain customers that may be interested in certain cuts of meat. It is also recognised that that one of the meat cuts may be already present in the portfolio 960 while another of the meat cuts may not yet be included in the portfolio 960. In this case, the portfolio 960 content may be optimized/adjusted by looking for and attempting to include those cuts of meat that have opposite price variations to those meat cuts already present in the portfolio 960, for example.

The optimization module 400 provides several advantages by generating optimization decisions 404, such as:

It reduces short-term exposure of the provider of the tool 12 to basis risk 912. The more cuts in a portfolio 960, the greater the likelihood that a high basis risk 912 on one cut will be offset by a low basis risk 912 on another cut, It creates an opportunity for arbitrage by aggregating different customers with different individual exposures into a lower risk portfolio 960, while still collecting basis risk premiums 916 priced to individual cuts. The weighted average sum of the basis risk premiums 916 charged on individual cuts is greater than the basis risk premium 916 that would be required for the overall portfolio 960 as demonstrated by table 420 and further described below.

It is known that diversification in an aggregate portfolio 960 which includes different types of assets can be quantified by an intra-portfolio correlation. This is a statistical measurement between negative one and positive one that measures the degree to which the various assets in a portfolio 960 can be expected to perform in a similar fashion or not. A measure of −1 means that the assets within the portfolio 960 perform perfectly oppositely: whenever one asset goes up, the other goes down. A measure of 0 means that the assets fluctuate independently, i.e. that the performance of one asset cannot be used to predict the performance of the others. A measure of 1, on the other hand, means that whenever one asset goes up, so do the others in the portfolio. To eliminate diversifiable risk completely, one needs an intra-portfolio correlation of −1. Prices of cuts of meat may move in the same direction depending on the price of live cattle; however, if a prediction model 204 of a first cut generates a positive error or basis (i.e. the model predicts higher prices 910 than occur on the market), it has been found that the prediction model 204 of a second cut that is negatively correlated with the first cut will generate a negative basis. In this way, a provider of the tool 12 is able to offset any losses from the first cut by increasing the quantity of the second cut in the portfolio 960.

The price of live animal (e.g. cattle) can be a significant factor that influences the market prices of cuts of meat. The expected price of live cattle for a period in the future is reflected in the price of live cattle futures. When live cattle goes up in price by a significant percentage, most if not all cuts of meat will follow the trend in the price of live cattle. In times of relative price stability in live cattle or when there is no discernible trend in the price of live cattle, however, the demand for a particular cut of meat may be a more dominant factor that influences the price of a particular cut of meat than the price of live cattle. Market demand itself may be influenced by several factors such as the season of the year or the economic prosperity of a given market. When prices of live cattle are relatively stable a pair of cuts of meat may be negatively correlated with each other, such that one of the cuts of meat in the pair is not following the movement in the price of live cattle futures. The optimization manager 402 can calculate an intra-portfolio correlation Q for each pair of cuts of meat in the portfolio 960 that share the same delivery period. The provider of the tool 12 sets pre-determined thresholds of positive and negative correlations such that decisions 404 are created by the optimization manager when negative correlations are at or below a pre-determined threshold and the positive correlations are at or above a pre-determined threshold. For example, in times of relative stability in the price of live cattle, the optimization manager 402 may determine that many pairs of cuts of meat are negatively or positively correlated with each other (and below or above the pre-determined thresholds respectively) giving the provider of the tool many options to optimize the portfolio 960 based on the decisions 404 created by the manager 402. As mentioned above, the models 204 that correspond to negatively correlated cuts of meat may be altered to effectively put the cuts of meat on sale and the models 204 that correspond to positively correlated cuts of meat may be altered to effectively make the cuts of meat more expensive. The adjustment module 540 may adjust the price of the basis risk premiums 916 up or down to make a cut more expensive or less expensive respectively.

As mentioned above, when the price of live animal (e.g. cattle) increases by a significant percentage and/or when the price of live cattle has a discernible trend, most if not all cuts of meat will change prices in the same direction of the price of live cattle. In this situation, most if not all pairs of cuts of meat will be positively correlated. In another embodiment of the tool 12, the optimization manager 402 can be operable to calculate a different intra-portfolio correlation factor Q than the one described above. The manager 402 analyzes the past predicted prices of each pair of cuts of meat for the same delivery period, for example, in the portfolio 960 and determines the basis (i.e. difference between actual market price and predicted price) in the predicted prices. The manager 402 then calculates an intra-portfolio correlation on the basis for the first cut of meat and the basis on the second cut of meat in the pair. The manager 402 creates decisions 404 that may be used by the adjustment module 540 when the correlation is above or below the pre-determined thresholds. For example, the manager 402 may determine that a first cut of meat historically has a negative basis for the delivery month and the second cut of meat historically has a positive basis for the delivery month (i.e. the model 204 of the first cut historically predicts prices above the respective market price and the model 204 of the second cut historically predicts prices below the respective market price). If the correlation between the first cut and the second cut is below the pre-determined threshold, the adjustment module 540 may adjust the models 204 (for example, by decreasing the basis risk premiums 916) corresponding to the first and second cuts to make the cuts less expensive. If the correlation between a first and second cut is positive and above a pre-determined threshold, the adjustment module 540 may adjust the models 204 (for example, by increasing the basis risk premiums 916) corresponding to the first and second cuts to make the cuts more expensive In an embodiment, the optimization module 400 employs a value-at-risk model that uses the technique known as intra-portfolio correlation to generate optimization decisions 404. The optimization manager 402 retrieves portfolio content 960 from the tables 24 by sending a request to the data manager 34. The aggregate portfolio content 960 is an aggregate collection of all prices, quantities, delivery periods and the types of meat for which the provider is providing future prices to members 8, as well as perhaps other information. The optimization manager 402 analyzes the aggregate portfolio content 960 and calculates the positive or negative correlation for pairs of different cuts of meat in the provider's portfolio 960. As is understood, optimizing a portfolio requires holding cuts of meat with poor (or offsetting) correlations. As mentioned above, if the prediction 910 of one cut has a positive basis then there is a higher likelihood that a poorly correlated cut will have a negative basis. When the provider of the tool 12 agrees to guarantee a forward price 910 for a particular cut to a customer 8, the optimization manager 402 will analyze which cuts have a poor correlation and either target customers who would be interested in forward prices 910 on those cuts and/or adjust the basis risk premium confidence level on those cuts down (analogous to putting those cuts "on sale"). Optimization decisions 404 may be in the form of a list of options which the provider can select to optimize the aggregate portfolio 960, and hence, lower the risk of the provider in providing forward prices 910. For example, the list may include an option to increase the basis risk premium confidence level 918 to one of several values, or to leave the basis risk premium confidence level 918 at the same value. Alternatively, optimization decisions 404 may be executed directly by the optimization manager 402 to modify the basis risk premium confidence levels 918 of models 204 that correspond to cuts of meat that are poorly correlated.

In one embodiment, the optimization module 400 employs an intra-portfolio correlation that is represented by the following formula:

$$Q = \left(\sum_i \sum_j X_i X_j p_{ij}\right) / \left(\sum_i \sum_j X_i X_j\right)$$

Where Q is the intra-portfolio correlation,
X i is the fraction invested in asset i,
X j is the fraction invested in asset j,
P ij is the correlation between assets i and j,
The expression is only computed when i≠j In the above equation, it is noted that there is a unique intra-portfolio correlation for every pair of assets in a particular delivery period. For example, if the provider of the tool 12 is guaranteeing the forward prices 910 of rib-eyes for December, strip-loins for December and rib-eyes for February of the same year in its aggregate portfolio 960, there will be a correlation factor Q only for the pair made up of rib-eyes for December and strip-loins for December. The optimization manager 402 does not compute a correlation factor for rib-eyes for February with the other assets because of the seasonal nature of cuts of meat. That is, it is not expected that rib-eyes for February are statistically correlated with cuts of meat for months other than February. It is to be understood that in other embodiments of the tool 12, however, a year may be divided up into seasons instead of months. In this embodiment, there is a correlation factor Q for every cut of meat that shares a delivery season. For example, the manager 402 will calculate one correlation factor for rib-eyes with strip-loins that are to be delivered in Spring, but not for rib-eyes to be delivered in Spring with strip-loins to be delivered in Fall. To calculate the correlation factor Q for a given pair of assets in the same delivery period, the optimization manager 402 takes two vectors of historic data as inputs and calculates the correlation coefficient Pij: one vector represents data for the first cut of meat for the delivery period, the second vector represents data for the second cut of meat for the delivery period. For example, the provider of the tool may use 8 years of data for the delivery month to calculate Q. In this example, the first vector contains average prices of the first cut for the delivery month in each year and the second vector contains average prices of the second cut for the delivery month in each year. As is known, the correlation coefficient Pij indicates the strength and direction of a relationship between two random variables. The correlation coefficient implemented by the optimization manager 402 may be a known correlation coefficient that uses covariance or other statistical properties or may be a customized correlation coefficient developed by the provider that is specific to the tool 12. In another embodiment of the tool 12, in calculating the correlation factor Q, the first input vector contains the average daily prices for each day in the delivery month for the first cut, and the second vector contains the average daily prices for each day in the delivery month for the second cut. It will be understood that the input vectors may include sample daily prices for each day, one specific day or a group of days in the delivery month for the first and second cuts respectively.

In operation, the optimization manager 402 retrieves the aggregate portfolio content 960 from the data manager 34 as an input. For each pair of assets in the portfolio (i.e. the cuts of meat in the same delivery month for which the provider has secured forward prices 910), the optimization manager 402 generates an intra-portfolio correlation factor. The correlation factor for the asset pair represents the relative movements of one cut of meat in the asset pair relative to the other cut of meat in the asset pair for the particular delivery month. The optimization manager 402 is operable to analyse the set of intra-portfolio correlations and generate optimization decisions 404. In an embodiment, the manager 402 searches for intra-portfolio correlations that are negative and below a pre-determined threshold (−0.5 for example). The manager 402 produces decisions 404 that are designed to increase the content of the portfolio 960 made up of asset pairs below the negative pre-determined threshold. The manager 402 also searches for portfolio correlations that are positive and above a pre-determined threshold (+0.5 for example) and produces decisions 404 designed to decrease the content of the portfolio 960 devoted to the asset pairs above the pre-determined threshold. It is to be understood that the pre-determined thresholds are set by the provider of the tool 12 and may be changed by the provider at any time. As mentioned above, the decisions 404 may be used to modify the models 204 of cuts of meat such that asset pairs with negative correlations are put on sale and asset pairs with positive correlations are made more expensive.

In one embodiment, the optimization manager 402 uses pre-determined setting to determine if both cuts of meat in a pair with offsetting correlations should be put on sale or if only one of the cuts and which one of the cuts of meat should be put on sale. The settings are customizable by the provider of the tool 12. For example, a provider of the tool 12 may create electronic settings that instruct the manager 402 to put one cut of meat in the pair on sale at a discount equal to twice as much of the other cut of meat in the pair, either in absolute monetary terms or as a percentage of the predicted future price 910. It is to be understood that the provider may create such settings for each cut of meat in the portfolio relative to each of the other cuts of meat in the portfolio. In another aspect, an employee of the provider of the tool makes this decision after prompting by the manager 402 on a user interface 28. For example, the employee may wish to consider other information such as business trends, competitive strategy, short-term weather predictions or any other information relevant to the business of the provider of the tool 12.

In one embodiment, the optimization manager 402 communicates the optimization decisions 404 to an adjustment module 540 which directly adjusts the internal structure of models 204 to put certain cuts of meat on sale and to make other cuts of meat more expensive.

Adjustment Module 540

Figure 18:
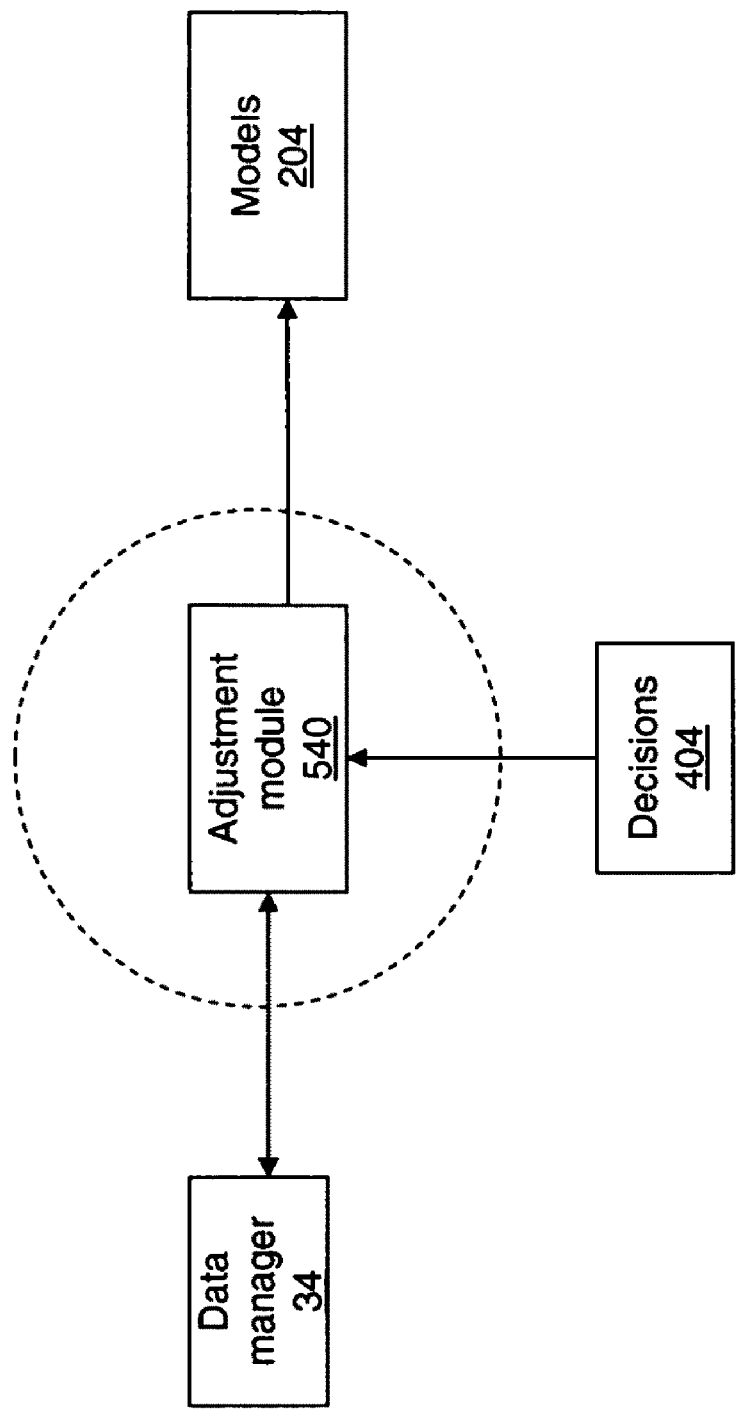
FIG. 18 is an adjustment module of the portfolio management tool of FIG. 15.

Referring next to FIG. 18, an adjustment module 540 of the tool 12 is illustrated. The adjustment module 540 receives optimization decisions 404 from the optimization model 400. Optimization decisions 404 may be executable electronic instructions to be executed by the adjustment module 540 to adjust models 204 or may be in the form of a data set that is retrievable by the adjustment module 540 via the data manager 34. The adjustment module 540 reads and/or executes the optimization decisions 404 and modifies the internal structure of models 204. For example, the optimization manager 402 may determine that a first cut of meat in the portfolio is well correlated with a certain cut, that a second cut of meat in the portfolio is poorly correlated with the certain cut and there is no correlation between the first cut and the second cut. The manager 402 creates optimization decisions 404 to decrease the quantity of the first cut in the portfolio 960 and to increase the quantity of the second cut in the portfolio 960. The adjustment module 540 receives the optimization decisions 404 as an input and adjusts the models 204 that correspond to the first and second cuts respectively. Specifically, to reduce the overall risk of the portfolio 960, the adjustment module 540 adjusts the model 204 of the first cut to provide a disincentive to prospective customers by increasing the basis risk premium 916a of the first cut. The provider has several options for increasing the basis risk premium 916a of the first cut. The adjustment module 540 may increase the basis risk premium confidence level 918a of the first cut from 80% to 90%, meaning that a customer must pay an amount of money equal to a 40% risk of the forecast to secure a predicted price 910. Alternatively, the adjustment module 540 may directly increase the basis risk premium 916a of the first cut to a predefined level, making the first cut of meat more expensive than it was prior to modification by the adjustment module 540. Additionally, the adjustment module 540 decreases the basis risk premium confidence level 918b of the second cut, which lowers the basis risk premium 916a of the second cut, effectively putting the second cut on sale. For example, the adjustment module 540 may decrease the basis risk premium confidence level 918b on the second cut to 70%, meaning that a member 8 must only pay an amount equal to a 20% risk of the forecast to secure a predicted price 910. Alternatively, the adjustment module 540 may directly decrease the basis risk premium 916b on the second cut. It is expected that over time, putting cuts of meat with offsetting correlations on sale will decrease the overall risk that the provider of the tool 12 is exposed to in securing the predicted prices 910 of the cuts of meat in the aggregate portfolio 960. Likewise, making cuts of meat with positive correlations more expensive will also decrease the risk exposure of the provider of the tool 12 in guaranteeing forward prices 910 for cuts of meat in the aggregate portfolio 960.

Figure 19:
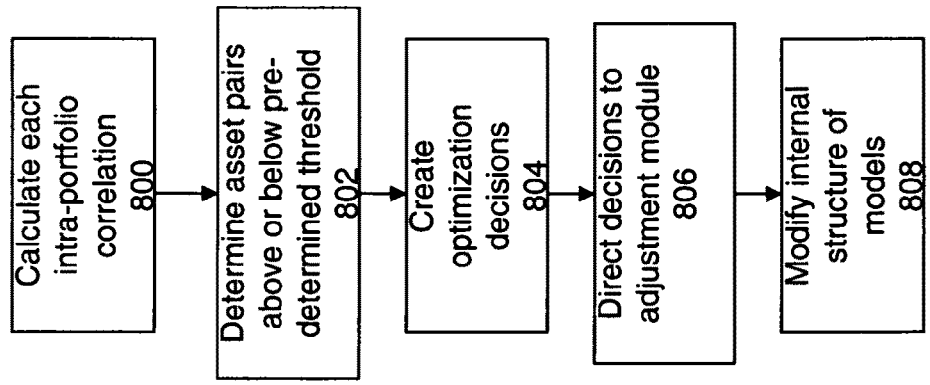
FIG. 19 is a flow-chart of the steps performed by the optimization module and the adjustment module of the portfolio management tool of FIG. 15.

Reference is next made to FIG. 19, which illustrates the series of steps performed by the optimization manager 402 and the adjustment module 540 in optimizing the risk level associated with the portfolio 960 of the provider of the tool 12. At step 800, the optimization manager 402 calculates the intra-portfolio correlation of each pair of cuts of meat that share a delivery month in the portfolio 960. At step 802, the optimization manager 402 analyzes each correlation term and determines if the correlation terms are above or below a pre-determined threshold. For example, the provider may customize the optimization module 400 such that the optimization manager 402 creates optimization decisions 404 for each correlation term above +0.5 and below −0.5. At step 804, the optimization manager 402 creates the appropriate optimization decisions 404 for each correlation term that is above or below the predetermined thresholds. The optimization decisions 404 are directed to the adjustment module 540 at step 806. At step 808, the adjustment module 540 retrieves the models 204 that correspond to the optimization decisions 404 and modifies the models 204 as described above, to either increase or decrease the basis risk premium 916 on the relevant cuts of meat.

Reference is next made to FIG. 20, which illustrates the advantageous net effect of the operations performed by the optimization module 400 and the adjustment module 540 on the risk level of the aggregate portfolio 960 held by the provider of the portfolio management tool 12. The table 940 shows the content of the portfolio 960 (i.e. by cut of meat 506 and the percentage 942 of the portfolio 960 made up of each cut), the individual basis risk premium 916 for each cut of meat, the weighted average basis risk premium 944 and the aggregate basis risk premium 946 of the aggregate portfolio 960. The basis risk premium 944 is a weighted average of the basis risk premiums 916 as the selected cuts 506 were sold individually to different members 8. As shown, the weighted average of the basis risk premiums 944 charged for guaranteeing future prices 910 of those cuts of meat to members 8 is $0.1569. That is, the provider of the tool 12 has collected an average basis risk premium 944 of $0.1569 per cut 506 as the provider has built up the portfolio 960. However, the basis risk premium 946 that would have been required if the cuts of meat 506 were all sold to one customer is only $0.0995. The provider of the tool is able to realize a net benefit 948 of +$0.0574 on each cut of meat, which represents the benefit of executing the optimization decisions 404 of the optimization module 400. The net benefit 948 to the provider of the tool 12 is realized by creating an aggregate portfolio 960 of pairs of assets with offsetting correlation values by adjusting the basis risk premium confidence levels 918 of the assets as described above. The optimization decisions 404 provide an incentive to members 8 to buy cuts of meat that lower the risk exposure of the provider and a disincentive to members 8 to buy cuts of meat that increase the risk exposure of the provider of the tool 12.

As an example, the percentage of a portfolio 960a (not shown) devoted to the cut '90s' is 20% and the percentage of the portfolio 960a devoted to '50s' is 10%. The remaining percentage of the portfolio 960a is made up of other cuts not relevant to the example. The optimization manager 402 determines that asset pairs '90s', '50s' are negatively correlated and below a pre-determined threshold. In portfolio 960a, the net benefit 948a is lower than the net benefit 948 of +$0.0574 in Table 940. The manager 402 generates decisions to put '90s' and '50s' on sale by lowering the basis risk premium 916 on each of the cuts. The basis risk premium 916 on the other cuts of meat in the portfolio 960a may also be modified or may stay the same depending on the provider. In addition, because the provider of the tool knows the portfolio correlation between '90s', '50s', the provider may target customers 8 that are interested in these cuts. Over time, members 8 buy more of '90s' and '50s' eventually leading to the provider having the portfolio 960 in Table 940 made up of 32% of '90s' and 18% of '50s'. The provider now realizes a greater net benefit 948 of +$0.574 in the portfolio 960 as compared to the net benefit 948a in the portfolio of 960a. The net benefit 948 of the portfolio 960 is greater than that of portfolio 960a because the portfolio 960 is less risky to the provider of the tool 12, yet the provider of the portfolio 960 is able to charge individual basis risk premiums 916 that do not reflect the offsetting correlations in the cuts of meat in the portfolio 960.

It will be appreciated that another set of optimization decisions 404 may result in a higher or lower net benefit 948 to the provider of the tool 12 and that other diversification strategies are usable by the tool 12 in lowering the risk exposure in the aggregate portfolio 960. For example, in another embodiment, the optimization decisions 404 are not directly executed by the adjustment module 540, but instead, are used by the provider of the tool 12 for analysis only. The provider of the tool 12 may choose to implement the optimization decision 404 as described above or may choose to disregard the optimization decisions 404. In yet another embodiment, the provider of the tool 12 can set a maximum percentage for each cut of meat that can be included in the aggregate portfolio 960. For example, a provider of the tool 12 may wish to limit the content of the portfolio 960 devoted to rib-eyes to 20%, or any other percentage. Once 20% of the portfolio content is devoted to rib-eyes, customers 8 no longer have the ability to secure forward prices 910 of rib-eyes until rib-eyes make up less than 20% of the aggregate portfolio 960.

We claim:

1. A method for determining a future price of a selected meat cut type (MCT) of an animal for a selected future time period (FTP), the method including the steps implemented on a computer processor of:
   receiving the selected MCT;
   storing the selected MCT in a memory;
   calculating with the computer processor using a price model the future price of the selected MCT for the selected FTP, the price model expressed as a relationship between historical market price of the selected MCT for one or more time periods prior to the selected FTP and live animal futures defining a price of the live animal traded as a commodity;
   calculating with the computer processor a price premium associated with the future price, the price premium representing a monetary value associated with the future price in exchange for assuming a risk that the predicted future price may be different from the eventual market price of the selected MCT when reaching the selected FTP, and a hedge relationship defining the relative price of the live animal futures with the future price for the selected MCT; and
   sending the future price and the price premium for the selected MCT for presentation on a user interface.

2. The method of claim 1 further including the step of including an error term in the price model, the error term defined as a relationship between a historical value of a previously determined future price for an earlier time period prior to the selected FTP and a historical market price of the selected MCT for the earlier time period.

3. The method of claim 2, wherein the error term is a residual term of the price model for the earlier time period.

4. The method of claim 2, wherein the error term includes two residuals of the price model corresponding to two earlier time periods prior to the selected FTP.

5. The method of claim 4, wherein the selected FTP is a month and the corresponding two earlier time periods are two months prior to the selected FTP.

6. The method of claim 2, wherein the price model includes input parameters selected from the group comprising: the live animal future for one or more time periods prior to the selected FTP; the live animal future during the selected FTP; the live animal future after the selected FTP.

7. The method of claim 2, wherein the price model is configured as a linear regression model based on the live animal futures and historical MCT prices for one or more time periods prior to the selected FTP, the price model expressed as a curve of best fit.

8. The method of claim 2, wherein one or more of the price models are provided for determining the future price of the MCT for each of a plurality of corresponding FTPs.

9. The method of claim 3, wherein the animal is selected from the group consisting of: cattle and hogs.

10. The method of claim 2, wherein the hedge relationship is a ratio between the price of the live animal future and said future price for the selected MCT.

11. The method of claim 2, wherein the error term is a difference between the historical value of the previously determined future price and the historical market price of the selected MCT for a time period earlier than the selected FTP for a specified level of the live animal future.

12. The method of claim 2, wherein the selected FTP is selected from the group consisting of: a month; a quarter of a year; a selected combination of months; a week; and a day.

13. The method of claim 12, wherein the earlier time period is selected from the group consisting of: a month; a quarter of a year; a selected combination of months; a week; and a day.

14. The method of claim 1 further comprising the step of receiving an order for a quantity of the selected MCT for the determined future price and purchasing an associated quantity of at least one live animal futures contract, the associated quantity calculated using the hedge relationship for the selected MCT and the quantity of the selected MCT.

15. The method of claim 14 further comprising the step of selling the associated quantity of the at least one live animal futures contract at a settlement time period based on the selected FTP.

16. The method of claim 15, wherein the settlement time period is prior to reaching the selected FTP.

17. The method of claim 15, wherein the settlement time period is after reaching the selected FTP.

18. The method of claim 15, wherein the settlement time period is the same as the selected FTP.

19. The method of claim 8 further comprising the step of receiving an order for a quantity of the selected MCT distributed over two of the selected FTPs and purchasing an associated quantity of a live animal futures contract for each of the two selected FTPs based on the respectively determined hedge relationships for each of the selected FTPs.

20. The method of claim 19 further comprising the step of selling each of the quantities of the live animal futures contracts at a respective settlement time period based on the respective selected FTP, such that the respective settlement time period is different for each of the two selected FTPs.

21. A system for determining a future price of a selected meat cut type (MCT) of an animal for a selected future time period (FTP), the system including:
 a computer processor;
 a receipt module for receiving the selected MCT;
 a memory for storing the selected MCT;
 a predictor module configured for calculating using a price model to determine the future price of the selected MCT for the selected FTP, the price model expressed as a relationship between historical market price of the selected MCT for one or more time periods prior to the selected FTP and live animal futures defining a price of the live animal traded as a commodity;
 the predictor module further configured for calculating a price premium associated with the future price, the price premium representing a monetary value associated with the future price in exchange for assuming a risk that the predicted future price may be different from the eventual market price of the selected MCT when reaching the selected FTP, and a hedge relationship defining the relative price of the live animal futures with the future price for the selected MCT; and
 a presentation module for sending the future price and the price premium for the selected MCT for presentation on a user interface.

22. The system of claim 21, wherein the price model further includes an error term in the price model, the error term defined as a relationship between a historical value of a previously determined future price for an earlier time period prior to the selected FTP and a historical market price of the selected MCT for the earlier time period.

23. The system of claim 22, wherein one or more of the price models are provided for determining the future price of the MCT for each of a plurality of corresponding FTPs.

24. The system of claim 21 further comprising a purchase module for receiving an order for a quantity of the selected MCT for the determined future price and for purchasing an associated quantity of at least one live animal futures contract, the associated quantity calculated using the hedge relationship for the selected MCT and the quantity of the selected MCT.

25. The system of claim 24, wherein the purchase module is further configured for selling the associated quantity of the at least one live animal futures contract at a settlement time period based on the selected FTP.

26. The system of claim 23 further comprising a purchase module for receiving an order for a quantity of the selected MCT distributed over two of the selected FTPs and for purchasing an associated quantity of a live animal futures contract for each of the two selected FTPs based on the respectively determined hedge relationships for each of the selected FTPs.

27. The system of claim 26, wherein the purchase module is further configured for selling each of the quantities of the live animal futures contracts at a respective settlement time period based on the respective selected FTP, such that the respective settlement time period is different for each of the two selected FTPs.

* * * * *